United States Patent
Sato et al.

(10) Patent No.: US 9,703,289 B2
(45) Date of Patent: Jul. 11, 2017

(54) VEHICLE CONTROL APPARATUS AND VEHICLE CONTROL METHOD

(71) Applicant: TOYOTA JIDOSHA KABUSHIKI KAISHA, Toyota-shi, Aichi-ken (JP)

(72) Inventors: Jun Sato, Susono (JP); Masahiro Iwasaki, Numazu (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 17 days.

(21) Appl. No.: 14/815,180

(22) Filed: Jul. 31, 2015

(65) Prior Publication Data

US 2016/0033964 A1 Feb. 4, 2016

(30) Foreign Application Priority Data

Aug. 1, 2014 (JP) .................................. 2014-157812

(51) Int. Cl.
  *G05D 1/00* (2006.01)
  *B60K 28/06* (2006.01)
  (Continued)

(52) U.S. Cl.
  CPC ............ *G05D 1/0061* (2013.01); *B60K 28/06* (2013.01); *B60W 30/12* (2013.01); *B60W 30/16* (2013.01);
  (Continued)

(58) Field of Classification Search
  CPC .......... G05D 1/0061; G05D 2201/0213; G05D 1/0214; G05D 1/0055; G05D 1/024;
  (Continued)

(56) References Cited

U.S. PATENT DOCUMENTS

| 5,774,069 A | * | 6/1998 | Tanaka ..................... B60T 7/12 180/167 |
| 5,801,667 A | * | 9/1998 | Shimizu ................. H04N 7/183 340/435 |

(Continued)

FOREIGN PATENT DOCUMENTS

| JP | 09-161196 A | 6/1997 |
| JP | 2002-251690 A | 9/2002 |

(Continued)

*Primary Examiner* — Nicholas Kiswanto
*Assistant Examiner* — Kenny A Taveras
(74) *Attorney, Agent, or Firm* — Sughrue Mion, PLLC

(57) ABSTRACT

A vehicle control apparatus that switches an operating condition of a vehicle to a manual operation when the vehicle reaches a preset initial switch position while an automatic operation is underway includes: a driver condition determination unit configured to determine whether or not a driver is in a manual operation acceptance condition; an evacuation space identification unit configured to identify an evacuation space provided on a path of the vehicle before the initial switch position on the basis of map information; and a switch position setting unit configured to set a switch position in which the operating condition of the vehicle is to be switched from the automatic operation to the manual operation, in a position between the vehicle and the evacuation space when the driver is not in the manual operation acceptance condition.

7 Claims, 11 Drawing Sheets

(51) Int. Cl.
  *B60W 30/12* (2006.01)
  *B60W 30/16* (2012.01)
  *B60W 40/08* (2012.01)
  *B60W 50/12* (2012.01)
  *G05D 1/02* (2006.01)

(52) U.S. Cl.
  CPC ............ *B60W 40/08* (2013.01); *B60W 50/12* (2013.01); *G05D 1/0274* (2013.01); *B60W 2040/0818* (2013.01); *B60W 2540/26* (2013.01)

(58) Field of Classification Search
  CPC .. G05D 1/0257; G05D 1/0274; G05D 1/0278; G05D 1/0088; G05D 1/021; G05D 1/0212; G05D 1/0246; G05D 1/0027; G05D 1/0223; G05D 1/0276; B60W 2550/12; B60W 50/082; B60W 50/14; B60W 2050/146; B60W 2540/26; B60W 2550/22; B60W 30/00; B60W 30/12; B60W 30/16; B60W 2050/0292; B60W 2530/14; B60W 2540/04; B60W 2540/18; B60W 2550/10; B60W 2550/146; B60W 2550/30; B60W 30/09; B60W 10/04; B60W 10/06; B60W 10/10; B60W 10/11; B60W 10/18; B60W 10/182; B60W 10/184; B60W 10/20; B60W 2040/0872; B60W 30/1884; B60W 40/064; B60W 50/0098; B60W 50/035; B60W 50/085; B60W 50/087; B60W 50/10; B60K 2350/1076; B60K 28/06; B60K 28/066; B60K 31/00; B60K 35/00; B60K 26/02; B60K 28/10
  See application file for complete search history.

(56) References Cited

U.S. PATENT DOCUMENTS

| | | | | |
|---|---|---|---|---|
| 5,906,645 | A * | 5/1999 | Kagawa | B60T 7/12 180/167 |
| 8,660,734 | B2 * | 2/2014 | Zhu | G05D 1/0214 701/23 |
| 8,718,858 | B2 * | 5/2014 | Al-Mahnna | G01C 21/3602 701/23 |
| 2012/0046817 | A1 | 2/2012 | Kindo et al. | |
| 2012/0078509 | A1 * | 3/2012 | Choi | G01C 21/3461 701/423 |
| 2013/0018549 | A1 * | 1/2013 | Kobana | B60K 28/06 701/41 |
| 2014/0222277 | A1 * | 8/2014 | Tsimhoni | B60W 30/00 701/23 |
| 2015/0274158 | A1 * | 10/2015 | Fujita | B60W 30/00 701/23 |
| 2016/0033964 | A1 * | 2/2016 | Sato | B60K 28/06 701/24 |
| 2016/0362113 | A1 * | 12/2016 | Takaso | B60W 10/18 |

FOREIGN PATENT DOCUMENTS

| | | |
|---|---|---|
| JP | 2007-196809 A | 8/2007 |
| JP | 2007199939 A | 8/2007 |
| JP | 2008290680 A | 12/2008 |
| JP | 2010-264829 A | 11/2010 |
| JP | 2011-131838 A | 7/2011 |

* cited by examiner

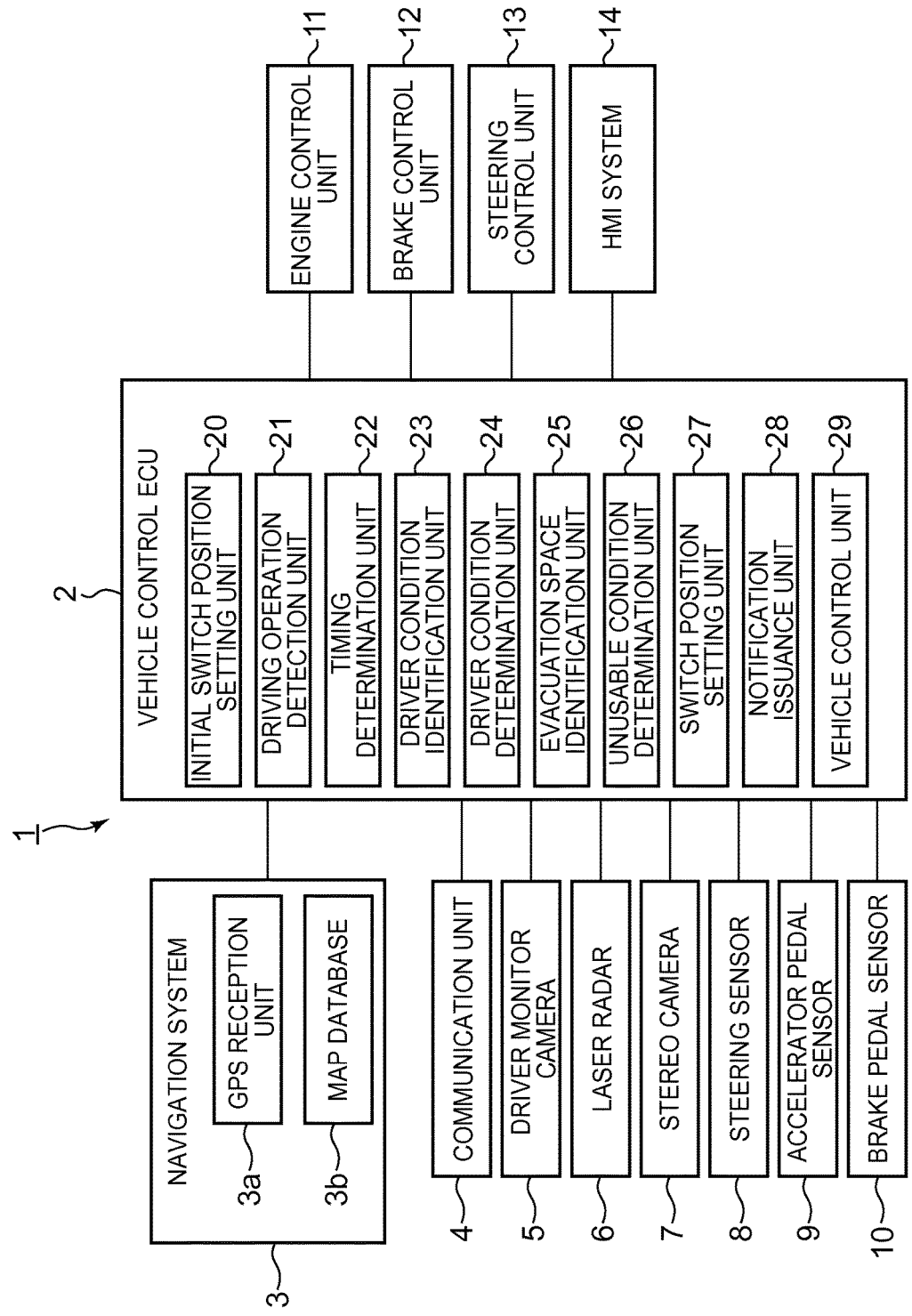

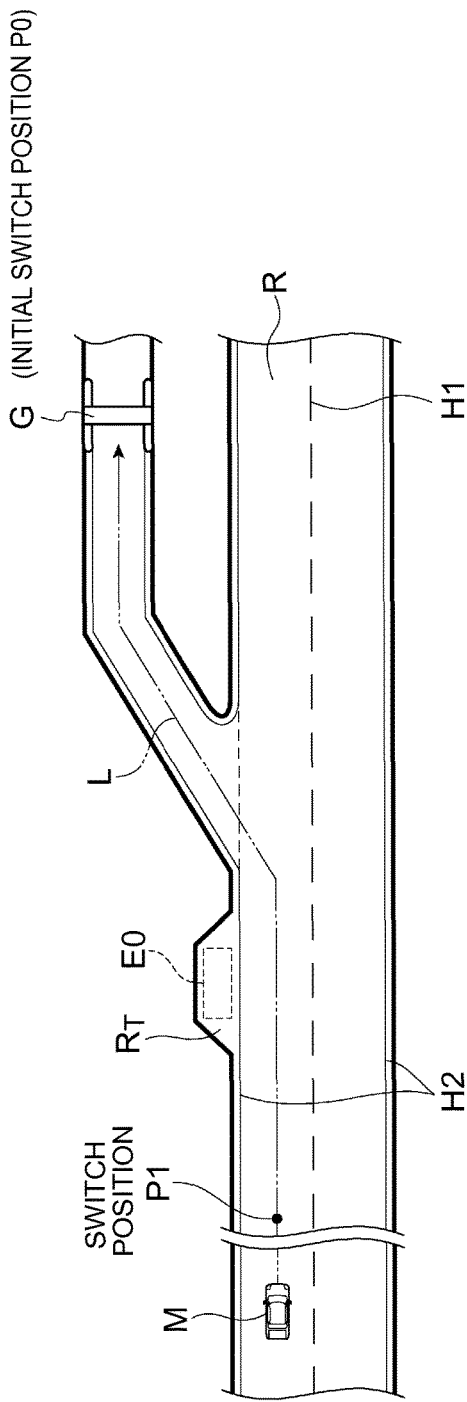
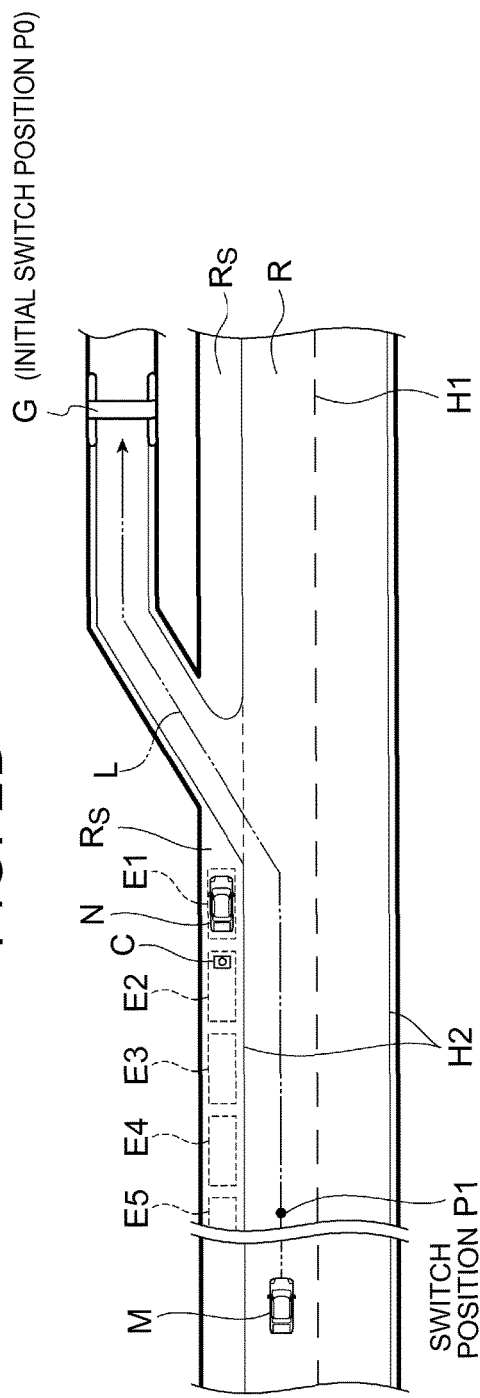

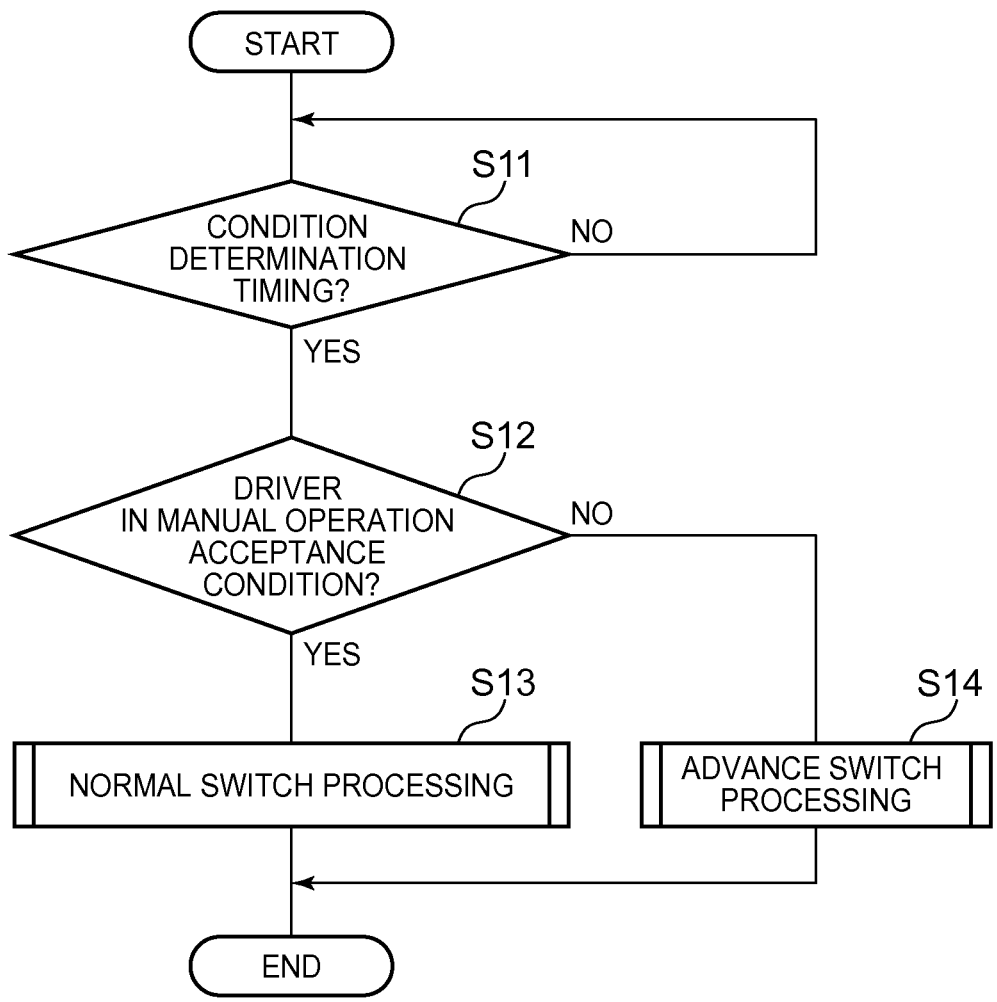

ns entirety.

VEHICLE CONTROL APPARATUS AND VEHICLE CONTROL METHOD

INCORPORATION BY REFERENCE

The disclosure of Japanese Patent Application No. 2014-157812, filed on Aug. 1, 2014 including the specification, drawings and abstract, is incorporated herein by reference in its entirety.

BACKGROUND OF THE INVENTION

1. Field of the Invention

The invention relates to a vehicle control apparatus and a vehicle control method with which an operating condition of a vehicle can be switched between an automatic operation and a manual operation.

2. Description of Related Art

An apparatus described in Japanese Patent Application Publication No. 9-161196 (JP 9-161196 A) is available as a vehicle control apparatus capable of switching an operating condition of a vehicle between an automatic operation and a manual operation. JP 9-161196 A describes an apparatus in which a scheduled point for switching the operating condition of the vehicle from the automatic operation to the manual operation is set in advance so that when the vehicle approaches the scheduled point, a notification is issued to prompt a driver to perform an operation to switch to the manual operation.

In the conventional apparatus described above, the notification prompting the driver to perform the operation to switch the operating condition of the vehicle from the automatic operation to the manual operation is issued before the vehicle reaches the scheduled point. However, when the notification is issued in a case where the driver is not in a condition to be able to handle the manual operation, it may not be appropriate to switch the operating condition of the vehicle from the automatic operation to the manual operation at the scheduled point.

SUMMARY OF THE INVENTION

The invention provides a vehicle control apparatus and a vehicle control method with which an operating condition of a vehicle can be switched from an automatic operation to a manual operation in an appropriate position set on the basis of a condition of a driver.

A first aspect of the invention relates to a vehicle control apparatus that switches an operating condition of a vehicle between an automatic operation and a manual operation, and switches the operating condition of the vehicle to the manual operation when the vehicle reaches a preset initial switch position while the automatic operation is underway. The vehicle control apparatus includes: a timing determination unit configured to determine whether or not a preset condition determination timing has arrived on the basis of a distance between the vehicle and the initial switch position on a path of the vehicle when the operating condition of the vehicle corresponds to the automatic operation; a driver condition identification unit configured to identify a driver condition of a driver of the vehicle; a driver condition determination unit configured to determine whether or not the driver is in a manual operation acceptance condition on the basis of the driver condition identified by the driver condition identification unit when the timing determination unit determines that the condition determination timing has arrived; an evacuation space identification unit configured to identify an evacuation space provided on the path of the vehicle before the initial switch position on the basis of map information; and a switch position setting unit configured to set a switch position in which the operating condition of the vehicle is to be switched from the automatic operation to the manual operation, in a position between the vehicle and the evacuation space on the path of the vehicle when the driver condition determination unit determines that the driver is not in the manual operation acceptance condition.

The vehicle control apparatus may further include a vehicle control unit configured to determine whether or not the vehicle has reached the switch position on the basis of the map information, and switches the operating condition of the vehicle from the automatic operation to the manual operation after determining that the vehicle has reached the switch position.

In the vehicle control apparatus according to this aspect of the invention, the determination as to whether or not the driver is in the manual operation acceptance condition is made before the operating condition of the vehicle is switched from the automatic operation to the manual operation, and when the driver is determined not to be in the manual operation acceptance condition, the switch position is set in a position located before the evacuation space on the path of the vehicle. With this vehicle control apparatus, therefore, in comparison with a conventional apparatus that does not take the condition of the driver into account, the operating condition of the vehicle can be switched to the manual operation in an appropriate position set on the basis of the condition of the driver while also taking the evacuation space into account.

The vehicle control apparatus may further include: a driving operation detection unit configured to detect a driving operation performed on the vehicle by the driver; a notification issuance unit configured to issue a notification to prompt the driver to start a driving operation before the vehicle reaches the switch position when the switch position has been set by the switch position setting unit; a driving operation determination unit configured to determine whether or not the driving operation performed by the driver is an inappropriate driving operation on the basis of a detection result from the driving operation detection unit after the notification issuance unit issues the notification to prompt the driver to start the driving operation but before the vehicle reaches the switch position; and an automatic evacuation unit configured to evacuate the vehicle automatically to the evacuation space when the driving operation determination unit determines that the driving operation is an inappropriate driving operation. According to this configuration, the notification to prompt to start the driving operation is issued before the vehicle reaches the switch position, and when the driving operation performed by the driver is determined to be an inappropriate driving operation thereafter, the vehicle is evacuated automatically to the evacuation space. As a result, a situation in which the operating condition of the vehicle is switched to the manual operation even though the driver remains unable to handle the manual operation favorably can be avoided.

The vehicle control apparatus may further include a driving skill identification unit configured to identify a driving skill of the driver on the basis of a driving operation history of the driver. In this case, the switch position setting unit may be configured to set the switch position in a position within a region having a road shape that corresponds to the driving skill of the driver, identified by the driving skill identification unit. According to this configuration, the switch position is set in a position within a region having a road shape that corresponds to the driving skill of the driver. With this vehicle control apparatus, therefore, the operating condition of the vehicle can be switched from the automatic operation to the manual operation in an appropriate position set in consideration of the driving skill of the driver.

The vehicle control apparatus may further include an unusable condition determination unit configured to determine whether or not the evacuation space is in an unusable condition on the basis of road environment information obtained by road-to-vehicle communication or vehicle-to-vehicle communication. In this case, the switch position setting unit may be configured to set the switch position in a position between the vehicle and the evacuation space determined by the unusable condition determination unit not to be in the unusable condition. With this vehicle control apparatus, the determination as to whether or not the evacuation space is in the unusable condition is made on the basis of the road environment information obtained by road-to-vehicle communication or vehicle-to-vehicle communication, and the switch position is set in a position located before an evacuation space determined not to be in the unusable condition. As a result, a situation in which the evacuation space is in the unusable condition when the vehicle is evacuated can be avoided.

A second aspect of the invention relates to a vehicle control method for a vehicle in which an operating condition is switched between an automatic operation and a manual operation, and the operating condition is switched to the manual operation when the vehicle reaches a preset initial switch position while the automatic operation is underway. The vehicle control method includes: determining whether or not a preset condition determination timing has arrived on the basis of a distance between the vehicle and the initial switch position on a path of the vehicle when the operating condition of the vehicle corresponds to the automatic operation; identifying a driver condition of a driver of the vehicle; determining whether or not the driver is in a manual operation acceptance condition on the basis of the identified driver condition when the condition determination timing is determined to have arrived; identifying an evacuation space provided on the path of the vehicle before the initial switch position on the basis of map information; and setting a switch position in which the operating condition of the vehicle is to be switched from the automatic operation to the manual operation, in a position between the vehicle and the evacuation space on the path of the vehicle when the driver is determined not to be in the manual operation acceptance condition.

The vehicle control method may further include: determining whether or not the vehicle has reached the switch position on the basis of the map information; and switching the operating condition of the vehicle from the automatic operation to the manual operation after determining that the vehicle has reached the switch position.

In the vehicle control method according to this aspect of the invention, the operating condition of the vehicle can be switched to the manual operation in an appropriate position set on the basis of the condition of the driver while also taking the evacuation space into account.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a block diagram showing a vehicle control apparatus according to a first embodiment;

FIG. 2A is a plan view showing a case in which an evacuation space is an emergency parking area, and FIG. 2B is a plan view showing a case in which the evacuation space is a roadside area;

FIG. 3 is a flowchart showing a vehicle control method employed by the vehicle control apparatus according to the first embodiment;

DETAILED DESCRIPTION OF EMBODIMENTS

Figure 4:
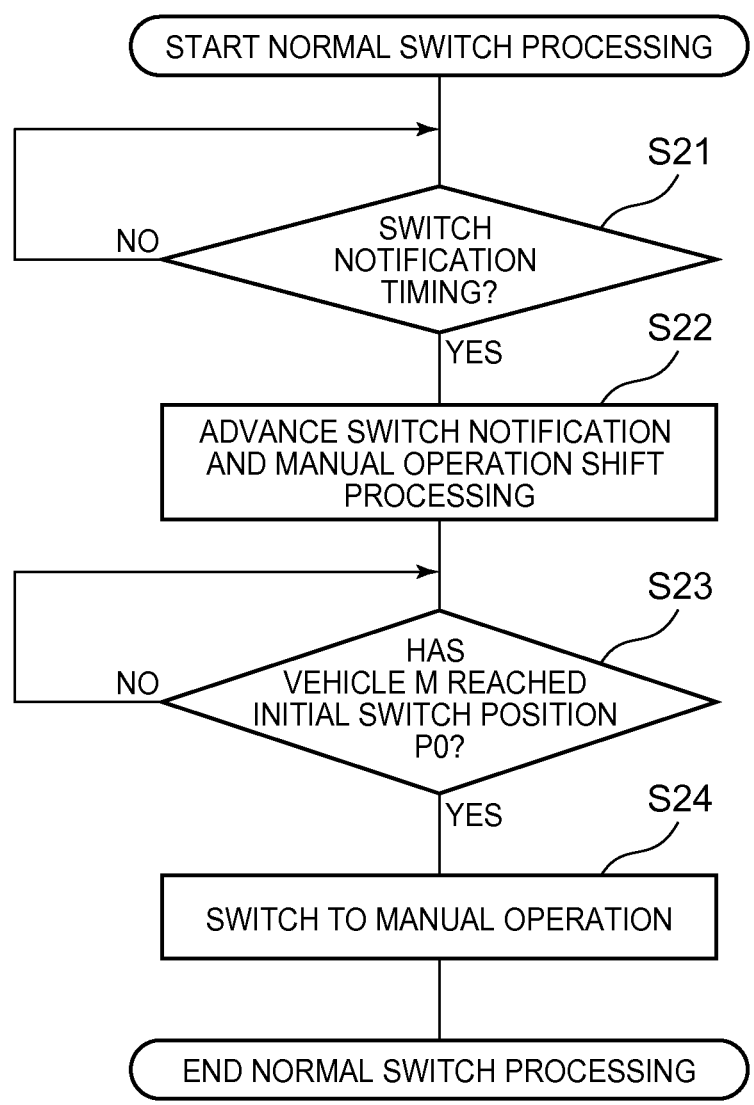
FIG. 4 is a flowchart showing normal switch processing of FIG. 3.

Embodiments of the invention will be described in detail below with reference to the drawings.

First Embodiment

FIG. 1 is a block diagram showing a vehicle control apparatus 1 according to a first embodiment. The vehicle control apparatus 1 shown in FIG. 1 is installed in a vehicle such as a passenger vehicle, for example, and used to control travel behavior of the vehicle. The vehicle control apparatus 1 switches an operating condition of the vehicle between an automatic operation (automatic driving) and a manual operation (manual driving). The automatic operation denotes, for example, an operating condition in which the vehicle is caused to travel automatically along a travel road of the vehicle. The automatic operation includes an operating condition in which the vehicle is caused to travel automatically toward a preset destination without the need for a driver to perform driving operations, for example. The vehicle does not necessarily have to be controlled entirely automatically during the automatic operation, and the automatic operation includes an operating condition in which the driving operations performed by the driver are reflected in the travel behavior of the vehicle within a preset allowable range. In other words, the automatic operation includes control for reflecting the driving operations performed by the driver in the travel behavior of the vehicle within the preset allowable range while intervening forcibly in the travel behavior of the vehicle under specific conditions. The allowable range will be described in detail below.

The automatic operation according to this embodiment includes, for example, automatic steering (an automatic steering operation) and automatic speed regulation (an automatic speed regulation operation). Automatic steering denotes an operating condition in which steering of the vehicle is controlled automatically. In this embodiment, automatic steering includes lane keeping assist (LKA). LKA is control for steering the vehicle automatically so that the vehicle does not deviate from a travel lane. In LKA, the vehicle is steered automatically along the travel lane even when the driver does not operate a steering wheel, for example. Even when LKA is underway, the vehicle control apparatus 1 may reflect a steering wheel operation performed by the driver in the steering of the vehicle within a range (an allowable range) ensuring that the vehicle does not deviate from the travel lane. Note that automatic steering is not limited to LKA.

Automatic speed regulation denotes an operating condition in which a speed of the vehicle is controlled automatically. Automatic speed regulation includes adaptive cruise control (ACC). In ACC, for example, fixed speed control is performed such that the vehicle travels at a preset fixed speed when no preceding vehicle exists in front of the vehicle, and when a preceding vehicle exists in front of the vehicle, adaptive control is performed to adjust the vehicle speed of the vehicle in accordance with an inter-vehicle distance to the preceding vehicle. The vehicle control apparatus 1 decelerates the vehicle in response to a brake operation (an operation of a brake pedal, for example) performed by the driver even when ACC is underway. Further, even when ACC is underway, the vehicle control apparatus 1 may accelerate the vehicle to a preset maximum allowable speed (a maximum speed determined by law on the current travel road, for example) in response to an accelerator operation (an operation of an accelerator pedal, for example) performed by the driver. Note that automatic speed regulation is not limited to ACC, and also includes cruise control (CC), in which only fixed speed control is implemented.

The manual operation denotes an operating condition in which the vehicle is caused to travel mainly on the basis of the driving operations performed by the driver, for example. The manual operation includes an operating condition in which the vehicle is caused to travel only on the basis of the driving operations performed by the driver, for example. Here, the manual operation according to this embodiment also includes an operating condition in which driving operation assist control is performed to assist the driving operations performed by the driver in addition to the driving operations performed by the driver. For example, the driving operation assist control according to this embodiment is control implemented when the vehicle travels on a curve to assist a steering torque on the basis of a curvature of the curve so that an appropriate steering amount is generated by the driver. The driving operation assist control also includes, for example, guidance control for ensuring that a steering operation is performed by the driver in an appropriate steering direction by applying torque to the steering wheel. The accelerator operation (the operation of the accelerator pedal, for example) or the brake operation (the operation of the brake pedal, for example) performed by the driver may also be assisted in the driving operation assist control. On the other hand, the driving operation assist control does not include control for causing the vehicle to travel automatically by intervening forcibly in the driving operations performed by the driver. In other words, the manual operation does not include control (LKA, ACC, and so on, for example) for reflecting the driving operations performed by the driver in the travel behavior of the vehicle within the preset allowable range while intervening forcibly in the travel behavior of the vehicle under fixed conditions (when the vehicle deviates from the lane or the like, for example).

The manual operation also includes manual steering (a manual steering operation) and manual speed regulation (a manual speed regulation operation), for example. Manual steering denotes an operating condition in which the vehicle is steered mainly on the basis of steering operations performed by the driver. Manual speed regulation denotes an operating condition in which the speed of the vehicle is regulated mainly on the basis of the accelerator operations and brake operations performed by the driver. When the vehicle control apparatus 1 executes LKA (automatic steering) alone, for example, the speed of the vehicle is regulated by manual speed regulation performed by the driver. When the vehicle control apparatus 1 executes automatic speed regulation (ACC) alone, for example, the vehicle is steered by manual steering performed by the driver.

The vehicle control apparatus 1 starts the automatic operation when the driver performs an automatic operation starting operation. The automatic operation starting operation is performed by pressing an automatic operation start switch provided on the steering wheel, for example. The vehicle control apparatus 1 cancels the automatic operation when the driver performs an automatic operation cancelation operation, for example. The automatic operation cancelation operation is performed by pressing an automatic operation cancel switch provided on the steering wheel, for example. The vehicle control apparatus 1 may also cancel the automatic operation when a driving operation is performed at an operation amount exceeding a preset allowable operation amount of the automatic operation, for example when the driver performs an emergency brake operation during the automatic operation or the like.

The vehicle control apparatus 1 switches the operating condition of the vehicle from the automatic operation to the manual operation after determining that the vehicle has reached a preset initial switch position during the automatic operation. The initial switch position is a reference position to switch the operating condition of the vehicle from the automatic operation to the manual operation. For example, the initial switch position corresponds to a boundary position on a path of the vehicle between a road environment in which the automatic operation can be continued and a road environment in which the automatic operation cannot be continued. The initial switch position may be a position between the vehicle and the boundary position on the path of the vehicle (a position located before the boundary position on the path of the vehicle, or in other words, a position on the vehicle side of the boundary position on the path of the vehicle).

The initial switch position is set in advance in accordance with content of the automatic operation. During an automatic operation performed exclusively on an expressway, for example, a position of an expressway exit that serves as a boundary between the expressway, on which the automatic operation can be continued, and a general road, on which the automatic operation cannot be continued, may be set as the initial switch position. An automatic operation performed exclusively on an expressway is an automatic operation in which ACC, LKA, and automatic lane change are executed in combination in an expressway environment, for example. Automatic lane change is control for changing the lane of the vehicle automatically under specific conditions, for example. Further, in LKA, a position of an entrance to a roadwork zone that serves as a boundary between a road environment in which a white line (a lane boundary line, a vehicle traffic zone line, or the like) on the travel road of the vehicle is identifiable and a road environment in which the white line on the road is unidentifiable due to roadwork, for example, may be set as the initial switch position.

When the operating condition of the vehicle corresponds to the automatic operation and it is determined that a preset condition determination timing has arrived, the vehicle control apparatus 1 determines whether or not the driver of the vehicle is in a manual operation acceptance condition. The preset condition determination timing will be described in detail below. The manual operation acceptance condition is a condition in which the driver is capable of adapting to the manual operation. The determination as to whether or not the driver is in the manual operation acceptance condition may be made on the basis of a degree of awakeness or a degree of driving concentration of the driver, for example. The degree of awakeness and the degree of driving concentration of the driver will be described in detail below. Having determined that the driver of the vehicle is in the manual operation acceptance condition, the vehicle control apparatus 1 determines whether or not the vehicle has reached the initial switch position, for example. Having determined that the vehicle has reached the initial switch position, the vehicle control apparatus 1 switches the operating condition of the vehicle from the automatic operation to the manual operation.

When, on the other hand, the vehicle control apparatus 1 determines that the driver of the vehicle is not in the manual operation acceptance condition, the vehicle control apparatus 1 identifies an evacuation space located on the path of the vehicle before the initial switch position. The evacuation space is a space to which the vehicle is evacuated. The evacuation space is positioned between the vehicle and the initial switch position (before the initial switch position on the path of the vehicle). A plurality of evacuation spaces may be identified. More specifically, for example, the evacuation space may be an emergency parking area provided on a shoulder of the travel road (a space provided on the shoulder of the road for damaged vehicles or emergency vehicles to park). The evacuation space may also be a roadside area on the travel road. The evacuation space may be any space connected to the travel road to which the vehicle can be evacuated appropriately. The evacuation space does not necessarily have to be a space that can accommodate the entire vehicle.

After identifying the evacuation space, the vehicle control apparatus 1 sets a position between the vehicle and at least one evacuation space on the path of the vehicle (a position before at least one evacuation space on the path of the vehicle) as an switch position. The switch position serves in place of the initial switch position as the reference position to switch the operating condition of the vehicle from the automatic operation to the manual operation. The switch position is positioned closer to the vehicle than the initial switch position on the path of the vehicle. When a plurality of evacuation spaces exist, the vehicle control apparatus 1 may set the evacuation space positioned closest to the initial switch position as a reference, and set a position before this reference evacuation space as the switch position, thereby ensuring that the automatic operation is continued for as long as possible. The switch position may be located a preset clearance distance (300 m, for example) before the reference evacuation space on the path of the vehicle, for example.

Furthermore, after determining that the driver of the vehicle is not in the manual operation acceptance condition, the vehicle control apparatus 1 may determine whether or not the evacuation space is in an unusable condition. In the unusable condition, the evacuation space is in use by another vehicle or the like. The vehicle control apparatus 1 determines whether or not the evacuation space is in the unusable condition on the basis of road environment information obtained by road-to-vehicle communication or vehicle-to-vehicle communication, for example. The road environment information includes, for example, information indicating a roadwork zone on the road, information indicating an accident zone on the road, information indicating an obstruction (another parked vehicle, a road cone, a pole, or the like, for example) on the road, information indicating traffic restrictions on the road, weather information indicating snow accumulation on the road, and so on. The vehicle control apparatus 1 sets the switch position in a position before an evacuation space that is determined not to be in the unusable condition. After determining that the vehicle has reached the switch position, the vehicle control apparatus 1 switches the operating condition of the vehicle from the automatic operation to the manual operation.

Note that the vehicle control apparatus 1 may inform the driver of the existence of the evacuation space before switching the operating condition of the vehicle from the automatic operation to the manual operation. Further, the vehicle control apparatus 1 may provide the driver with guidance relating to automatic vehicle evacuation to the evacuation space before switching the operating condition of the vehicle from the automatic operation to the manual operation. For example, the vehicle control apparatus 1 may evacuate the vehicle to the evacuation space automatically in response to a preset evacuation operation (an operation to press the automatic operation start switch, for example) performed by the driver before the vehicle reaches the switch position.

Furthermore, the vehicle control apparatus 1 may evacuate the vehicle to the evacuation space automatically when the vehicle control apparatus 1 determines that the driver is still not in the manual operation acceptance condition after determining again whether or not the driver is in the manual operation acceptance condition before the vehicle reaches the switch position. For example, when the vehicle reaches a position located a preset redetermination distance (200 m, for example) before the switch position on the path of the vehicle, the vehicle control apparatus 1 determines again whether or not the driver is in the manual operation acceptance condition. The redetermination distance is an appropriate reference distance to start determining the condition of the driver again. The redetermination distance may take a fixed value or a value that varies on the basis of the vehicle speed and so on.

In this embodiment, a switch from the automatic operation to the manual operation includes, for example, a switch from automatic steering to manual steering and a switch from automatic speed regulation to manual speed regulation. The vehicle control apparatus 1 executes the switch from automatic steering to manual steering and the switch from automatic speed regulation to manual speed regulation simultaneously, for example. The vehicle control apparatus 1 may execute the switch from automatic steering to manual steering and the switch from automatic speed regulation to manual speed regulation separately by controlling steering and speed regulation independently. More specifically, when it is possible to continue automatic speed regulation such as ACC after the vehicle reaches an initial switch position relating to automatic steering (a position of an entrance to a tunnel in which white line identification is difficult using LKA, for example) such that automatic steering is switched to the manual operation, the vehicle control apparatus 1 may continue automatic speed regulation.

Further, when the vehicle reaches the initial switch position or the switch position in a condition where steering is being performed automatically and speed regulation is being performed manually by the driver, the vehicle control apparatus 1 may switch from automatic steering to manual steering. Similarly, when the vehicle reaches the initial switch position or the switch position in a condition where speed regulation is being performed automatically and steering is being performed manually by the driver, the vehicle control apparatus 1 may switch from automatic speed regulation to manual speed regulation.

Here, referring to FIGS. 2A and 2B, examples of the evacuation space, the initial switch position, and the switch position will be described. FIG. 2A is a plan view showing a case in which the evacuation space is an emergency parking area, and FIG. 2B is a plan view showing a case in which the evacuation space is a roadside area. In FIGS. 2A and 2B, the expressway automatic operation is underway in a vehicle M. A reference symbol L denotes the path of the vehicle M. Further, a reference symbol R denotes the travel road on which the vehicle M is traveling. The travel road R is a two-lane expressway. Furthermore, a reference symbol H1 denotes a lane boundary of the travel road R, and a reference symbol H2 denotes a road traffic zone boundary of the travel road R. A reference symbol G denotes an exit (here, an electronic toll collection system (ECT) gate) from the expressway. The exit G corresponds to an initial switch position P0 of the expressway automatic operation.

In FIG. 2A, a reference symbol $R_T$ denotes an emergency parking area on the travel road R, and a reference symbol E0 denotes an evacuation space within the emergency parking area $R_T$. In the condition shown in FIG. 2A, the vehicle control apparatus 1 identifies the emergency parking area $R_T$ on the path L of the vehicle M to the exit G (the initial switch position P0) and identifies a space within the emergency parking area $R_T$ as the evacuation space E0 on the basis of map information provided by a navigation system or the like, for example. The vehicle control apparatus 1 then sets a position before the evacuation space E0 as a switch position P1. Note that when the emergency parking area $R_T$ is sufficiently large, the vehicle control apparatus 1 may identify a plurality of evacuation spaces within the emergency parking area $R_T$.

Further, in FIG. 2B, a reference symbol $R_S$ denotes a roadside area of the travel road R, and reference symbols E1 to E5 denote evacuation spaces within the roadside area $R_S$. Moreover, in FIG. 2B, a symbol N denotes another parked vehicle (an expressway maintenance vehicle, for example) in the roadside area $R_S$, and a reference symbol C denotes a road cone disposed in the roadside area $R_S$. In the condition shown in FIG. 2B, the vehicle control apparatus 1 identifies the roadside area $R_S$ on the path L of the vehicle M to the exit G and identifies spaces within the roadside area $R_S$ as the evacuation spaces E1 to E5 on the basis of the map information, for example. Note that the evacuation spaces E1 to E5 may overlap.

Furthermore, the vehicle control apparatus 1 determines whether or not the identified evacuation spaces E1 to E5 are in the unusable condition. When the vehicle control apparatus 1 detects an object such as the other vehicle N or the road cone C in the evacuation spaces E1, E2 on the basis of the road environment information obtained by road-to-vehicle communication or vehicle-to-vehicle communication, the vehicle control apparatus 1 determines that these evacuation spaces E1, E2 are in the unusable condition. Then, using the evacuation space E3, which is closest to the exit G of the evacuation spaces E3 to E5 that are not in the unusable condition, as a reference, for example, the vehicle control apparatus 1 sets a position before the evacuation space E3 as the switch position P1. Note that the vehicle control apparatus 1 may set the switch position P1 using the evacuation spaces E4, E5 as a reference.

A configuration of the vehicle control apparatus 1 according to the first embodiment will be described below with reference to the drawings. As shown in FIG. 1, the vehicle control apparatus 1 includes a vehicle control electronic control unit (ECU) 2 that controls the travel behavior of the vehicle M. The vehicle control ECU 2 is an electronic control unit constituted by a central processing unit (CPU), a read-only memory (ROM), a random access memory (RAM), and so on. Various types of vehicle control are executed in the vehicle control ECU 2 by loading a program stored in the ROM to the RAM and having the CPU execute the program. The vehicle control ECU 2 may be constituted by a plurality of electronic control units.

The vehicle control ECU 2 is connected to a navigation system 3, a communication unit 4, a driver monitor camera 5, a laser radar 6, a stereo camera 7, a steering sensor 8, an accelerator pedal sensor 9, and a brake pedal sensor 10. The vehicle control ECU 2 is also connected to an engine control unit 11, a brake control unit 12, a steering control unit 13, and a human machine interface (HMI) system 14.

The navigation system 3 guides the driver of the vehicle M to a destination set by the driver. The navigation system 3 includes a global positioning system (GPS) reception unit 3a for measuring a position of the vehicle M, and a map database 3b storing map information. The GPS reception unit 3a measures the position (latitude and longitude, for example) of the vehicle M by receiving signals from three or more GPS satellites, for example. The map information in the map database 3b includes, for example, information indicating a road position, information indicating a road type, information indicating a road shape, and so on.

The navigation system 3 identifies the travel road on which the vehicle M is traveling and the lane in which the vehicle M is traveling on the basis of information indicating the position of the vehicle M, measured by the GPS reception unit 3a, and the map information in the map database 3b. The navigation system 3 then calculates a route from the position of the vehicle M to the destination, and guides the driver along the route by outputting displays on a navigation display and a voice from a speaker provided in the vehicle M. The navigation system 3 transmits the information indicating the position of the vehicle M, information indicating the road (the lane) in which the vehicle M is traveling, and information indicating the route along which the vehicle M is to be guided, for example, to the vehicle control ECU 2.

The communication unit 4 obtains various information via a wireless communication network (a portable telephone communication network, a Vehicle Information and Communication System (VICS; registered trademark) communication network, or the like, for example). For example, the communication unit 4 obtains information indicating the road environment of the path L of the vehicle M through road-to-vehicle communication with a computer of a facility such as an information management center that manages traffic information. Road-to-vehicle communication is communication with an information management center or the like via a roadside transceiver (an optical beacon, an intelligent transport systems (ITS) spot, or the like, for example) provided on the side of the road, for example. Road-to-vehicle communication also includes communication with the information management center or the like via a wireless communication network such as that described above.

The communication unit 4 may also obtain information relating to another vehicle by vehicle-to-vehicle communication. For example, the communication unit 4 obtains information indicating the position of the other vehicle, the road environment information detected by the other vehicle, and so on by vehicle-to-vehicle communication. The communication unit 4 may also communicate with a portable information terminal (a smartphone, for example) in the vehicle, a wearable device worn by the driver, and so on. A wearable device is an electronic device having a function for detecting a heartbeat, brain waves, and so on of the driver when worn by the driver, for example. The wearable device may be a ring type device worn on the finger of the driver, a wristband type device worn on the wrist of the driver, a headband type device worn on the head of the driver, an eyewear type device worn on the head of the driver, and so on. The communication unit 4 may obtain physical condition information such as the heartbeat and brain waves of the driver by communicating with the wearable device. The communication unit 4 transmits the obtained communication information to the vehicle control ECU 2.

The driver monitor camera 5 is provided in a position directly in front of the driver on a cover of a steering column of the vehicle M, for example, in order to photograph the driver. The driver monitor camera 5 may be provided in a plurality so that the driver is photographed from a plurality of directions. The driver monitor camera 5 transmits information obtained by photographing the driver to the vehicle control ECU 2.

The laser radar 6 is provided on a front end of the vehicle M, for example, and uses laser to detect objects in front of the vehicle. The laser radar 6 detects an object such as another vehicle by, for example, transmitting a laser frontward from the vehicle and receiving a laser reflected by the object. The laser radar 6 outputs a signal corresponding to the detected object to the vehicle control ECU 2. Note that a millimeter wave radar or the like may be used instead of the laser radar 6.

The stereo camera 7 includes two image capturing units provided on a rear surface of a windshield of the vehicle M, for example. The two image capturing units are disposed side by side in a vehicle width direction of the vehicle M in order to photograph the front of the vehicle M. The stereo camera 7 transmits information obtained by photographing the front of the vehicle to the vehicle control ECU 2. Note that a monocular camera may be used instead of the stereo camera 7.

The steering sensor 8 includes a steering torque sensor and a steering touch sensor, for example. The steering torque sensor is provided on a steering shaft of the vehicle M, for example, in order to detect steering torque applied to the steering wheel by the driver. The steering touch sensor is provided on the steering wheel of the vehicle M, for example, in order to detect a touch of the driver on the steering wheel and a pressure with which the driver grips the steering wheel. The steering sensor 8 transmits steering information relating to steering performed by the driver to the vehicle control ECU 2 on the basis of detection results from the steering torque sensor and the steering touch sensor. Note that the steering sensor 8 does not necessarily have to include the steering touch sensor.

The accelerator pedal sensor 9 is provided on a shaft part of the accelerator pedal of the vehicle M, for example, in order to detect a depression amount of the accelerator pedal (a position of the accelerator pedal). The accelerator pedal sensor 9 outputs a signal corresponding to the detected depression amount of the accelerator pedal to the vehicle control ECU 2.

The brake pedal sensor 10 is provided in a part of the brake pedal, for example, to detect a depression amount of the brake pedal (a position of the brake pedal). The brake pedal sensor 10 may detect an operation force of the brake pedal (a depression force applied to the brake pedal, a pressure of a master cylinder, or the like). The brake pedal sensor 10 outputs a signal corresponding to the detected depression amount or operation force of the brake pedal to the vehicle control ECU 2.

The engine control unit 11 is an electronic control unit for controlling an engine of the vehicle M. The engine control unit 11 controls a driving force of the vehicle M by controlling amounts of fuel and air supplied to the engine, for example. Note that when the vehicle M is a hybrid vehicle or an electric vehicle, the engine control unit 11 functions as a motor control unit for controlling a motor that operates as a power supply. The engine control unit 11 controls the driving force of the vehicle M in accordance with a control signal from the vehicle control ECU 2.

The brake control unit 12 is an electronic control unit for controlling a brake system of the vehicle M. A hydraulic brake system, for example, may be used as the brake system. The brake control unit 12 controls a braking force applied to a vehicle wheel of the vehicle M by regulating an oil pressure applied to the hydraulic brake system. The brake control unit 12 controls the braking force applied to the vehicle wheel in accordance with a control signal from the vehicle control ECU 2. Note that when the vehicle M includes a regenerative brake system, the brake control unit 12 may control both the hydraulic brake system and the regenerative brake system.

The steering control unit 13 is an electronic control unit for controlling an electric power steering (EPS) system of the vehicle M. The steering control unit 13 controls the steering torque of the vehicle M by driving an assist motor provided in the EPS system to control the steering torque of the vehicle M. The steering control unit 13 controls the steering torque in accordance with a control signal from the vehicle control ECU 2.

The HMI system 14 is an interface for exchanging information between the driver and the vehicle control apparatus 1. The HMI system 14 includes, for example, a display on which image information is output, a speaker through which voice information is output, operating buttons or a touch panel on which the driver performs input operations, and so on. The HMI system 14 may identify voice input by the driver. The HMI system 14 outputs a signal corresponding to an operation performed by the driver to the vehicle control ECU 2. The HMI system 14 outputs information to the driver via the display or the speaker in accordance with a control signal from the vehicle control ECU 2.

Next, a functional configuration of the vehicle control ECU 2 will be described. The vehicle control ECU 2 includes an initial switch position setting unit 20, a driving operation detection unit 21, a timing determination unit 22, a driver condition identification unit 23, a driver condition determination unit 24, an evacuation space identification unit 25, an unusable condition determination unit 26, a switch position setting unit 27, a notification issuance unit 28, and a vehicle control unit 29. Note that some of the functions of the vehicle control ECU 2 described below may be executed on a computer provided in a facility such as an information management center capable of communicating with the vehicle M.

The initial switch position setting unit 20 sets the initial switch position P0 described above. When the automatic operation has been started in the vehicle M, for example, the initial switch position setting unit 20 sets the initial switch position P0 in accordance with the content of the automatic operation. For example, when the expressway automatic operation is started in the vehicle M, the initial switch position setting unit 20 sets the position of the exit G from the expressway on the path L of the vehicle M as the initial switch position P0 on the basis of the map information in the map database 3$b$. Further, the initial switch position setting unit 20 identifies a roadwork zone on the road, an accident-related traffic restriction zone, a weather-related traffic restriction zone, or the like on the basis of the road environment information obtained via the communication unit 4, for example. The initial switch position setting unit 20 then sets a position of an entrance to the traffic restriction zone or the like as the initial switch position P0 in accordance with the content of the automatic operation.

Note that the path L of the vehicle M is identified by the initial switch position setting unit 20 on the basis of the route guidance information from the navigation system 3, for example. When a destination has not been set in the navigation system 3 and route guidance is not provided, the initial switch position setting unit 20 may estimate the path L of the vehicle M from the position and an advancement direction of the vehicle M, for example. In this case, the initial switch position setting unit 20 may estimate a plurality of paths as the path L of the vehicle M and set the initial switch position P0 on each path L. Alternatively, the initial switch position setting unit 20 may set the position of the exit G from the expressway or the like as the initial switch position (the initial switch position of the expressway automatic operation) P0 in advance in the map information stored in the map database 3$b$ instead of identifying the path L of the vehicle M. The initial switch position setting unit 20 may set the initial switch position P0 using a conventional method.

The driving operation detection unit 21 detects driving operations performed by the driver of the vehicle M. The driving operation detection unit 21 detects the driving operations performed by the driver on the basis of steering information from the steering sensor 8, accelerator operation information from the accelerator pedal sensor 9, and brake operation information from the brake pedal sensor 10, for example.

When the operating condition of the vehicle M corresponds to the automatic operation, the timing determination unit 22 determines whether or not a preset condition determination timing has arrived. The timing determination unit 22 determines whether or not the condition determination timing has arrived on the basis of a distance between the vehicle M and the initial switch position P0 on the path L of the vehicle M. The condition determination timing is a timing to determine the condition of the driver before switching the operating condition of the vehicle M from the automatic operation to the manual operation. The condition determination timing may be set at a timing at which the distance between the vehicle M and the initial switch position P0 on the path L of the vehicle M falls to or below a preset condition determination distance (10 km, for example). Alternatively, the condition determination timing may be set at a timing at which a time remaining until the vehicle M reaches the initial switch position P0, assuming that the vehicle M travels at a fixed speed during the automatic operation, falls to or below a preset condition determination time (10 minutes, for example). The condition determination distance and the condition determination time may be fixed values or values that vary in accordance with the speed (the set speed of the automatic operation, for example) of the vehicle M or the like.

The driver condition identification unit 23 identifies a driver condition on the basis of the photographic information from the driver monitor camera 5, for example. The driver condition denotes the degree of awakeness of the driver, for example. The degree of awakeness of the driver is a measure indicating whether or not the driver is awake and not in a state of reduced consciousness due to lack of sleep or the like. The driver condition identification unit 23 identifies the degree of awakeness of the driver from the openness of the eyes of the driver, the frequency with which the driver blinks, eyeball movement, and the like on the basis of the photographic information from the driver monitor camera 5, for example. The driver condition identification unit 23 may also identify the degree of awakeness of the driver from the pressure with which the driver grips the steering wheel or a frequency with which the driver touches the steering wheel (a frequency with which the driver adjusts his/her grip on the steering wheel, for example) on the basis of the steering information from the steering sensor 8. Further, the driver condition identification unit 23 may obtain information indicating the heartbeat of the driver via a detection electrode provided on the steering wheel, and identify the degree of awakeness of the driver from the information indicating the heartbeat of the driver. Moreover, the driver condition identification unit 23 may obtain information indicating the heartbeat or brain waves of the driver by communicating with a wearable device worn by the driver or a portable information terminal via the communication unit 4, and identify the degree of awakeness of the driver from the information indicating the heartbeat or brain waves of the driver. Alternatively, the driver condition identification unit 23 may identify the degree of awakeness of the driver using a conventional method on the basis of various types of information.

Furthermore, the driver condition identification unit 23 may identify the degree of driving concentration of the driver as the driver condition. The degree of driving concentration of the driver is a measure indicating whether or not the driver is concentrating on driving the vehicle M. The driver condition identification unit 23 identifies the degree of driving concentration of the driver from an orientation of the face of the driver or a direction in which the driver is focused on the basis of the photographic information from the driver monitor camera 5, for example. The driver condition identification unit 23 may determine that the degree of driving concentration of the driver is low when the face of the driver is found not to be oriented toward the front of the vehicle M or an adjacent lane, i.e. when the driver is unfocused. The driver condition identification unit 23 may also determine that the degree of driving concentration of the driver is low when the driver is found to be focused on an in-vehicle audio device or the like. The driver condition identification unit 23 may identify the degree of driving concentration of the driver on the basis of a detection result from the driving operation detection unit 21. For example, the driver condition identification unit 23 may identify the degree of driving concentration of the driver from the pressure with which the driver grips the steering wheel or the frequency with which the driver touches the steering wheel on the basis of the steering information from the steering sensor 8. Further, the driver condition identification unit 23 may obtain information indicating the heartbeat of the driver via a detection electrode provided on the steering wheel, and identify the degree of driving concentration of the driver from the information indicating the heartbeat of the driver. Moreover, the driver condition identification unit 23 may obtain information indicating the heartbeat or the brain waves of the driver by communicating with a wearable device worn by the driver or a portable information terminal, and identify the degree of driving concentration of the driver from the information indicating the heartbeat or brain waves of the driver, for example. Alternatively, the driver condition identification unit 23 may identify the degree of driving concentration of the driver using a conventional method on the basis of various types of information.

The driver condition identification unit 23 may identify both the degree of awakeness of the driver and the degree of driving concentration of the driver, or either one thereof, as the driver condition. Further, the driver condition identification unit 23 may identify an index other than the degree of awakeness of the driver and the degree of driving concentration of the driver as the driver condition.

The driver condition determination unit 24 determines whether or not the driver is in the manual operation acceptance condition when the timing determination unit 22 determines that the preset condition determination timing has arrived. The driver condition determination unit 24 determines whether or not the driver is in the manual operation acceptance condition on the basis of the driver condition identified by the driver condition identification unit 23.

In a case where the driver condition identification unit 23 identifies the degree of awakeness of the driver as the driver condition, the driver condition determination unit 24 determines that the driver is in the manual operation acceptance condition when, for example, the degree of awakeness of the driver equals or exceeds a preset awakeness threshold. The awakeness threshold is a preset threshold for determining appropriately whether or not the driver of the vehicle M is in the manual operation acceptance condition during the automatic operation. The awakeness threshold may be a fixed value or a variable value. When the degree of awakeness of the driver is lower than the awakeness threshold, for example, the driver condition determination unit 24 determines that the driver is not in the manual operation acceptance condition.

Similarly, in a case where the driver condition identification unit 23 identifies the degree of driving concentration of the driver as the driver condition, the driver condition determination unit 24 determines that the driver is in the manual operation acceptance condition when, for example, the degree of driving concentration of the driver equals or exceeds a preset driving concentration threshold. The driving concentration threshold is a preset threshold for determining appropriately whether or not the driver of the vehicle M is in the manual operation acceptance condition during the automatic operation. The driving concentration threshold may be a fixed value or a variable value. When the degree of driving concentration of the driver is lower than the driving concentration threshold, for example, the driver condition determination unit 24 determines that the driver is not in the manual operation acceptance condition.

Further, in a case where the driver condition identification unit 23 recognizes both the degree of awakeness of the driver and the degree of driving concentration of the driver as the driver condition, the driver condition determination unit 24 may determine that the driver is in the manual operation acceptance condition when, for example, the degree of awakeness of the driver equals or exceeds the preset awakeness threshold and the degree of driving concentration of the driver equals or exceeds the preset driving concentration threshold. In this case, the driver condition determination unit 24 may determine that the driver is not in the manual operation acceptance condition either when the degree of awakeness of the driver is lower than the awakeness threshold or when the degree of driving concentration of the driver is lower than the driving concentration threshold.

The evacuation space identification unit 25 identifies an evacuation space on the path L of the vehicle M before the initial switch position P0. The evacuation space identification unit 25 performs evacuation space identification when the driver condition determination unit 24 determines that the driver is not in the manual operation acceptance condition, for example. The evacuation space identification unit 25 may identify a plurality of evacuation spaces on the path L of the vehicle M. The evacuation space identification unit 25 identifies an evacuation space on the path L of the vehicle M before the initial switch position P0 on the basis of the map information in the map database 3b, for example. Position data relating to evacuation spaces may be included in the map information in advance. The evacuation space identification unit 25 may identify an evacuation space by road-to-vehicle communication with an information management center or the like via the communication unit 4. The information management center may hold map information including the position data relating to the evacuation spaces, for example.

Note that the evacuation space identification unit 25 may also identify an evacuation space on the path L of the vehicle M by vehicle-to-vehicle communication with another vehicle (another vehicle traveling along the path L of the vehicle M, for example) via the communication unit 4. The evacuation space identification unit 25 may, for example, obtain information indicating the position of the other vehicle and road environment information detected by the other vehicle (information indicating objects on the periphery of the other vehicle, for example) by vehicle-to-vehicle communication, and identify an evacuation space by referring to the map information in the map database 3b.

The unusable condition determination unit 26 determines whether or not the evacuation space is in the unusable condition on the basis of the road environment information obtained by road-to-vehicle communication or vehicle-to-vehicle communication. For example, the unusable condition determination unit 26 determines that the evacuation space is in the unusable condition when the position of the evacuation space is identified, on the basis of the roadwork zone information obtained by road-to-vehicle communication with the information management center or the like via the communication unit 4, as being within a roadwork zone. The unusable condition determination unit 26 may also determine whether or not the evacuation space is in the unusable condition (a condition in which the vehicle M cannot be parked due to snow accumulation) on the basis of the weather information indicating snow accumulation on the road, which is obtained by road-to-vehicle information with the information management center or the like via the communication unit 4. For example, the unusable condition determination unit 26 determines that the evacuation space is in the unusable condition when the evacuation space is within a zone where an amount of accumulated snow equals or exceeds a preset snow accumulation threshold. The unusable condition determination unit 26 also determines that the evacuation space is in the unusable condition when the evacuation space is identified, on the basis of the road traffic restriction information included in the road environment information, as being within a no parking area.

The unusable condition determination unit 26 also determines that the evacuation space is in the unusable condition after determining, by vehicle-to-vehicle communication via the communication unit 4, for example, that another vehicle is parked in the evacuation space. Alternatively, the unusable condition determination unit 26 may obtain information indicating the position of another vehicle and road environment information detected by the other vehicle by vehicle-to-vehicle communication via the communication unit 4, and determine that the evacuation space is in the unusable condition when the other vehicle has detected an obstruction (snow, another parked vehicle, a damaged car, a pole used in roadwork, and so on, for example) in the position of the evacuation space. Note that the vehicle control ECU 2 does not necessarily have to include the unusable condition determination unit 26, and the determination as to whether or not the evacuation space is in the unusable condition does not necessarily have to be performed.

The switch position setting unit 27 sets the switch position P1 in which the operating condition of the vehicle M is switched from the automatic operation to the manual operation when the driver condition determination unit 24 determines that the driver is not in the manual operation acceptance condition. The switch position setting unit 27 sets the switch position P1 in a position before at least one evacuation space on the path L of the vehicle M. For example, the switch position setting unit 27 sets the switch position P1 in a position located the preset clearance distance (300 m, for example) before the evacuation space on the path L of the vehicle M. The clearance distance may be a fixed value or a value that varies in accordance with the speed (the set speed of the automatic operation, for example) of the vehicle M or the like.

Further, the switch position setting unit 27 may identify a roadwork zone or an accident zone on the path L of the vehicle M on the basis of the road environment information and so on obtained by road-to-vehicle communication and vehicle-to-vehicle communication. In this case, the switch position setting unit 27 sets the switch position P1 in a position outside the roadwork zone or accident zone. When the switch position setting unit 27 identifies a zone strongly affected by adverse weather conditions, such as a strong wind zone, the switch position setting unit 27 may set the switch position P1 in a position outside this zone. Moreover, the switch position setting unit 27 may modify the position of the switch position P1 when the reference evacuation space is newly determined to be in the unusable condition, the switch position P1 is determined to be within a roadwork zone or the like, and so on after setting the switch position P1.

The notification issuance unit 28 determines whether or not a preset advance switch notification timing has arrived on the basis of the distance between the vehicle M and the initial switch position P0 or the switch position P1 on the path L of the vehicle M, for example. In a case where the switch position P1 has not been set, the notification issuance unit 28 determines that the advance switch notification timing has arrived when the vehicle M reaches a position located a preset notification issuance distance (1 km, for example) before the initial switch position P0 on the path L of the vehicle M, for example. In a case where the switch position P1 has been set, the notification issuance unit 28 determines that the advance switch notification timing has arrived when the vehicle M reaches a position located the preset notification issuance distance before the switch position P1 on the path L of the vehicle M, for example. The notification issuance distance may be a fixed value or a value that varies in accordance with the speed and so on of the vehicle M. Further, the notification issuance distance used when the switch position P1 has not been set and the notification issuance distance used when the switch position P1 has been set may be different values. Note that the notification issuance unit 28 may determine whether or not the advance switch notification timing has arrived using time as a reference on the assumption that the vehicle M travels at a fixed speed during the automatic operation. When the switch position P1 has not been set, the notification issuance unit 28 may set the advance switch notification timing at a timing that is earlier than a predicted arrival time of the vehicle M at the initial switch position P0 by a preset notification issuance time. This applies likewise to a case in which the switch position P1 has been set. The notification deferral time may take a fixed value or a value that varies in accordance with the speed and so on of the vehicle M. Furthermore, the notification issuance time used when the switch position P1 has not been set and the notification issuance time used when the switch position P1 has been set may be different values.

Having determined that the advance switch notification timing has arrived, the notification issuance unit 28 issues an advance switch notification to the driver, for example. The advance switch notification is a notification informing the driver of an intended switch before the operating condition of the vehicle M is switched from the automatic operation to the manual operation. As the advance switch notification, the driver may be notified that the automatic operation will be terminated in a reference distance of 1 km, for example. The notification issuance unit 28 issues the advance switch notification to the driver by, for example, transmitting a control signal to the HMI system 14 to cause the HMI system 14 to output a voice and display an image.

Further, when the vehicle M has been switched to the manual operation upon reaching the switch position P1, the notification issuance unit 28 notifies the driver of the existence of the evacuation space, for example. As a result, the driver can evacuate the vehicle M to the evacuation space when unable to handle the manual operation. Note that instead of having the driver evacuate the vehicle to the evacuation space manually, the vehicle control apparatus 1 may evacuate the vehicle M to the evacuation space automatically in response to the preset evacuation operation performed by the driver. In this case, the notification issuance unit 28 notifies the driver that the preset evacuation operation is performed so that the vehicle M can be evacuated to the evacuation space automatically.

The vehicle control unit 29 controls the travel behavior of the vehicle M. The vehicle control unit 29 controls the travel behavior of the vehicle M by transmitting control signals to the engine control unit 11, brake control unit 12, and steering control unit 13, for example. The vehicle control unit 29 executes the automatic operation in response to the automatic operation start operation performed by the driver. The vehicle control unit 29 executes an automatic operation such as ACC or LKA on the basis of object information from the laser radar 6 and photographic information from the stereo camera 7, for example.

The vehicle control unit 29 performs manual operation shift processing to switch the operating condition of the vehicle M from the automatic operation to the manual operation when, for example, the notification issuance unit 28 determines that the advance switch notification timing has arrived. The manual operation shift processing is processing for preparing to switch from the automatic operation to the manual operation. During the manual operation shift processing, the vehicle control unit 29 may reflect the driving operations performed by the driver within the preset allowable range in the travel behavior of the vehicle M, for example. In this case, the notification issuance unit 28 may issue a notification to prompt the driver to start a driving operation as the advance switch notification. The vehicle control unit 29 continues to execute the calculations of the automatic operation during the manual operation shift processing. When the driver performs a driving operation that exceeds the preset allowable range (a steering operation performed with the aim of crossing the lane boundary without operating a blinker lever, for example), the vehicle control unit 29 prioritizes the automatic operation by not reflecting the driving operation in the travel behavior of the vehicle M. During the manual operation shift processing, the vehicle control unit 29 may increase a proportion of the operation amount of the driving operation performed by the driver that is reflected in the travel behavior of the vehicle M over time instead of reflecting the entire operation amount in the travel behavior of the vehicle M.

Note that the vehicle control unit 29 may start the manual operation shift processing at a different timing to the advance switch notification timing of the notification issuance unit 28. Further, the vehicle control unit 29 does not necessarily have to perform the manual operation shift processing to reflect the driving operations performed by the driver in the travel behavior of the vehicle M. The vehicle control unit 29 may reflect the driving operations performed by the driver in the travel behavior of the vehicle M after the vehicle M has been switched to the manual operation at the initial switch position P0 or the switch position P1 instead of reflecting the driving operations performed by the driver in the travel behavior of the vehicle M during the automatic operation including the manual operation shift processing.

The vehicle control unit 29 determines whether or not the vehicle M has reached the initial switch position P0 or the switch position P1 while the automatic operation is underway on the basis of the information indicating the position of the vehicle M, obtained from the GPS reception unit 3a, and the map information in the map database 3b. Having determined that the vehicle M has reached the initial switch position P0 or the switch position P1, the vehicle control unit 29 switches the operating condition of the vehicle M from the automatic operation to the manual operation. In the manual operation, the vehicle control unit 29 reflects the driving operations performed by the driver in the travel behavior of the vehicle M, for example.

Note that the vehicle control unit 29 may evacuate the vehicle M to the evacuation space automatically when the driver performs the preset evacuation operation before the vehicle M reaches the switch position P1. The vehicle control unit 29 may also evacuate the vehicle M to the evacuation space automatically when the driver condition determination unit 24 determines that the driver is still not in the manual operation acceptance condition after the vehicle M reaches a position located the preset redetermination distance (200 m, for example) before the switch position P1 on the path L of the vehicle M.

Next, vehicle control processing executed by the vehicle control apparatus 1 will be described with reference to the drawings. Here, vehicle control processing executed by the vehicle control apparatus 1 to switch the operating condition of the vehicle M from the automatic operation to the manual operation will be described. FIG. 3 is a flowchart showing the vehicle control processing executed by the vehicle control apparatus 1. The vehicle control apparatus 1 executes the control shown on the flowchart in FIG. 3 when the automatic operation is started in the vehicle M, for example.

As shown in FIG. 3, the vehicle control ECU 2 of the vehicle control apparatus 1 determines whether or not the condition determination timing has arrived using the timing determination unit 22 in step S11. The timing determination unit 22 determines whether or not the preset condition determination timing has arrived on the basis of the distance between the vehicle M and the initial switch position P0 on the path L of the vehicle M. The timing determination unit 22 repeats step S11 until the condition determination timing is determined to have arrived.

In step S12, the vehicle control ECU 2 determines whether or not the driver is in the manual operation acceptance condition using the driver condition determination unit 24. The driver condition determination unit 24 determines whether or not the driver is in the manual operation acceptance condition on the basis of the driver condition identified by the driver condition identification unit 23. When the driver condition determination unit 24 determines that the driver is in the manual operation acceptance condition (S12: YES), the vehicle control ECU 2 shifts to normal switch processing of step S13. When the driver condition determination unit 24 determines that the driver is not in the manual operation acceptance condition (S12: NO), the vehicle control ECU 2 shifts to advance switch processing of step S14.

Figure 5:
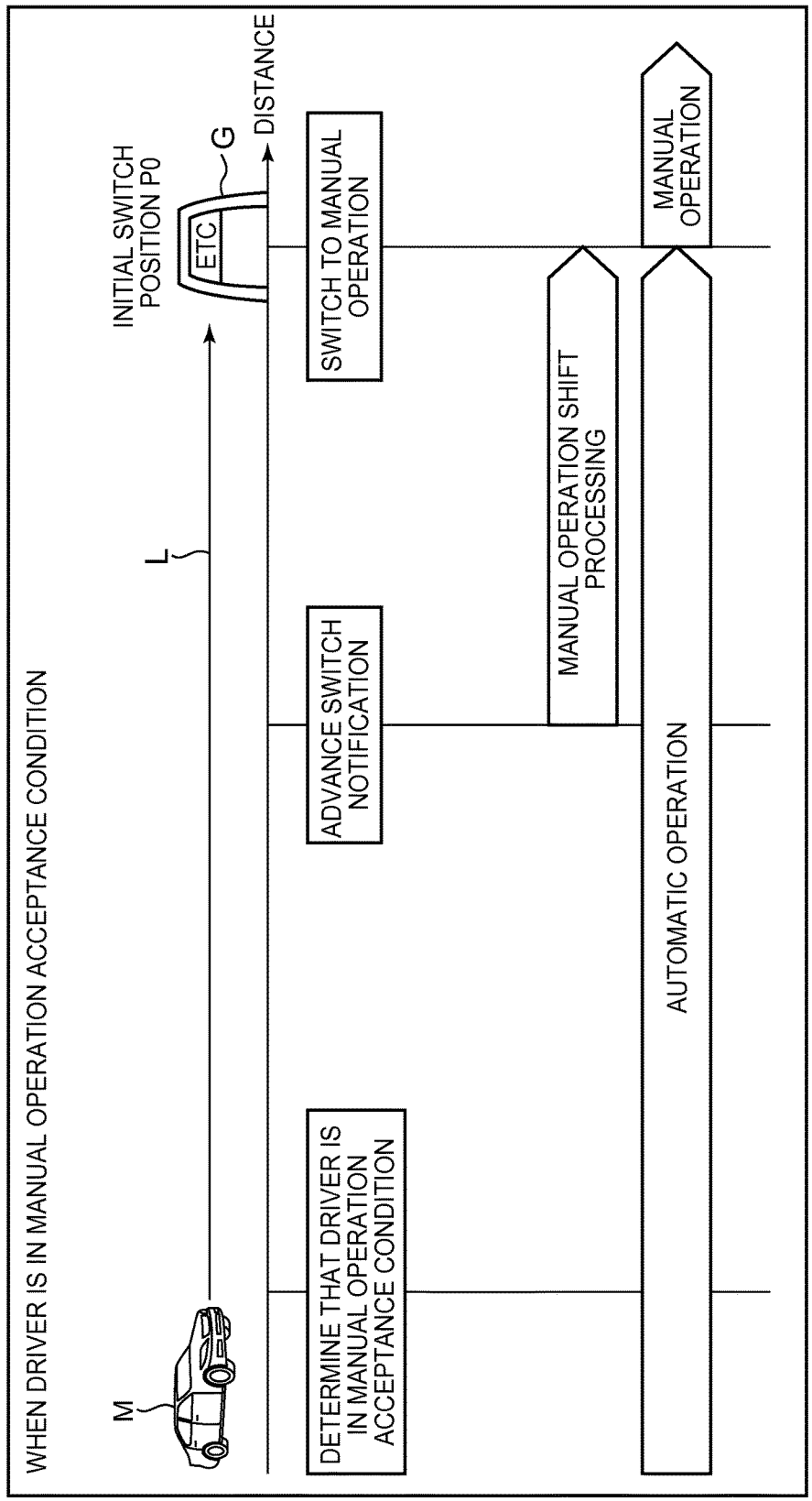
FIG. 5 is an illustrative view showing a switch from an automatic operation to a manual operation during the normal switch processing.

Next, the normal switch processing will be described with reference to FIGS. 4 and 5. FIG. 4 is a flowchart showing the normal switch processing of FIG. 3, and FIG. 5 is an illustrative view showing a switch from the automatic operation to the manual operation during the normal switch processing. A reference symbol E in FIG. 5 denotes the evacuation space.

In step S21, the vehicle control ECU 2 determines whether or not the advance switch notification timing has arrived using the notification issuance unit 28. The notification issuance unit 28 determines whether or not the advance switch notification timing has arrived using the initial switch position P0 as a reference. For example, the notification issuance unit 28 determines whether or not the preset advance switch notification timing has arrived on the basis of the distance between the vehicle M and the initial switch position P0 on the path L of the vehicle M. The notification issuance unit 28 repeats step S21 until the advance switch notification timing is determined to have arrived. When the notification issuance unit 28 determines that the advance switch notification timing has arrived (S21: YES), the vehicle control ECU 2 advances to step S22.

In step S22, the vehicle control ECU 2 issues the advance switch notification to the driver using the notification issuance unit 28. As well as issuing the advance switch notification using the notification issuance unit 28, the vehicle control ECU 2 starts the manual operation shift processing using the vehicle control unit 29. As well as issuing the advance switch notification, the notification issuance unit 28 issues a notification (a driving operation start notification) to prompt the driver to start a driving operation, for example. The driving operation start notification is a request to the driver to start a driving operation. In this case, the vehicle control unit 29 reflects driving operations performed by the driver within the preset allowable range in the travel behavior of the vehicle M during the manual operation shift processing.

Next, in step S23, the vehicle control ECU 2 determines whether or not the vehicle M has reached the initial switch position P0 using the vehicle control unit 29. The vehicle control unit 29 repeats the determination of step S23 until the vehicle M is determined to have reached the initial switch position P0.

When the vehicle control unit 29 determines that the vehicle M has reached the initial switch position P0 (S23: YES), the vehicle control ECU 2 advances to step S24. In step S24, the vehicle control unit 29 switches the operating condition of the vehicle M from the automatic operation to the manual operation using the vehicle control unit 29. Thereafter, the vehicle control unit 29 reflects the driving operations performed by the driver in the travel behavior of the vehicle M as the manual operation.

Figure 6:
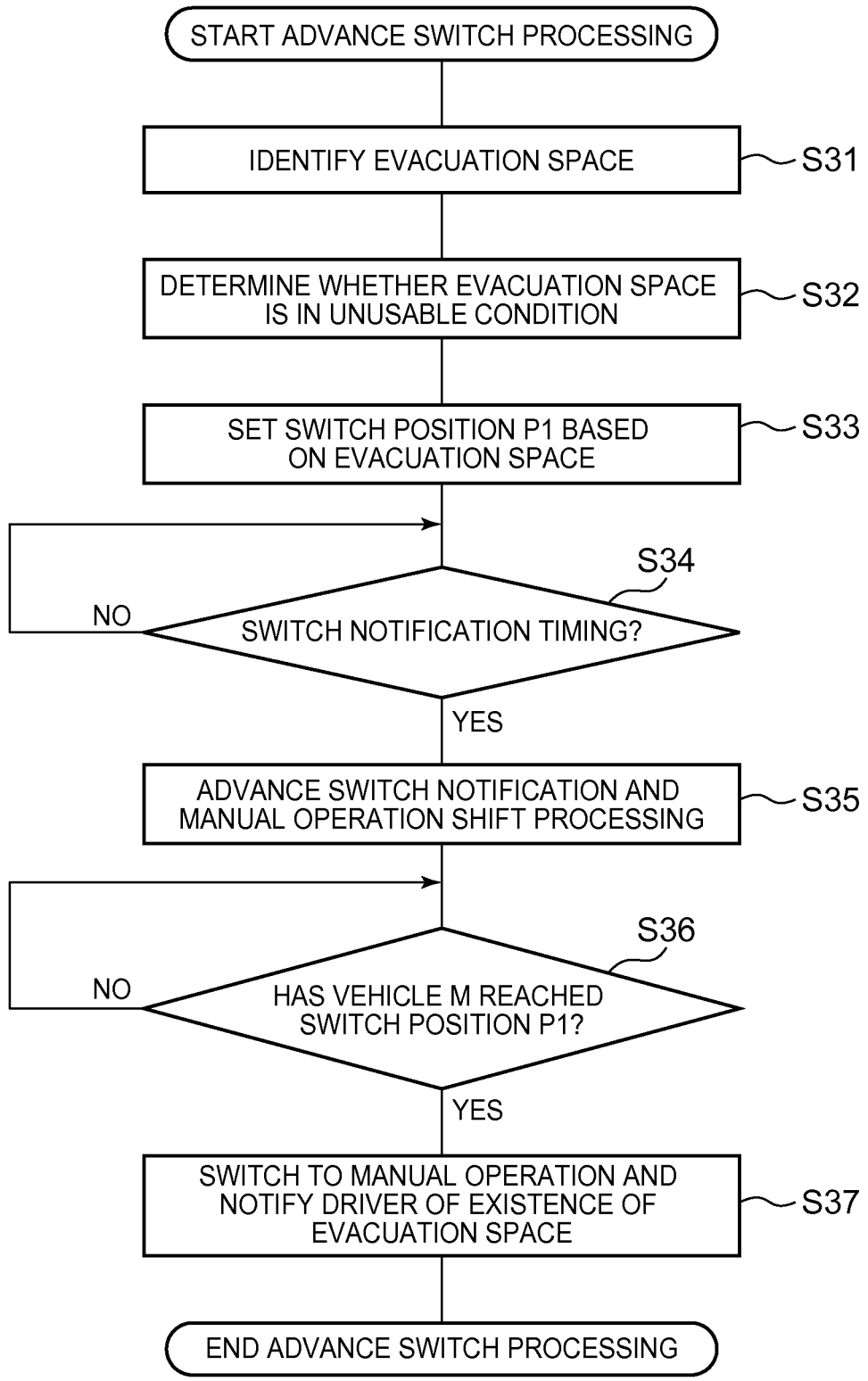
FIG. 6 is a flowchart showing advance switch processing of FIG. 3.
Figure 7:
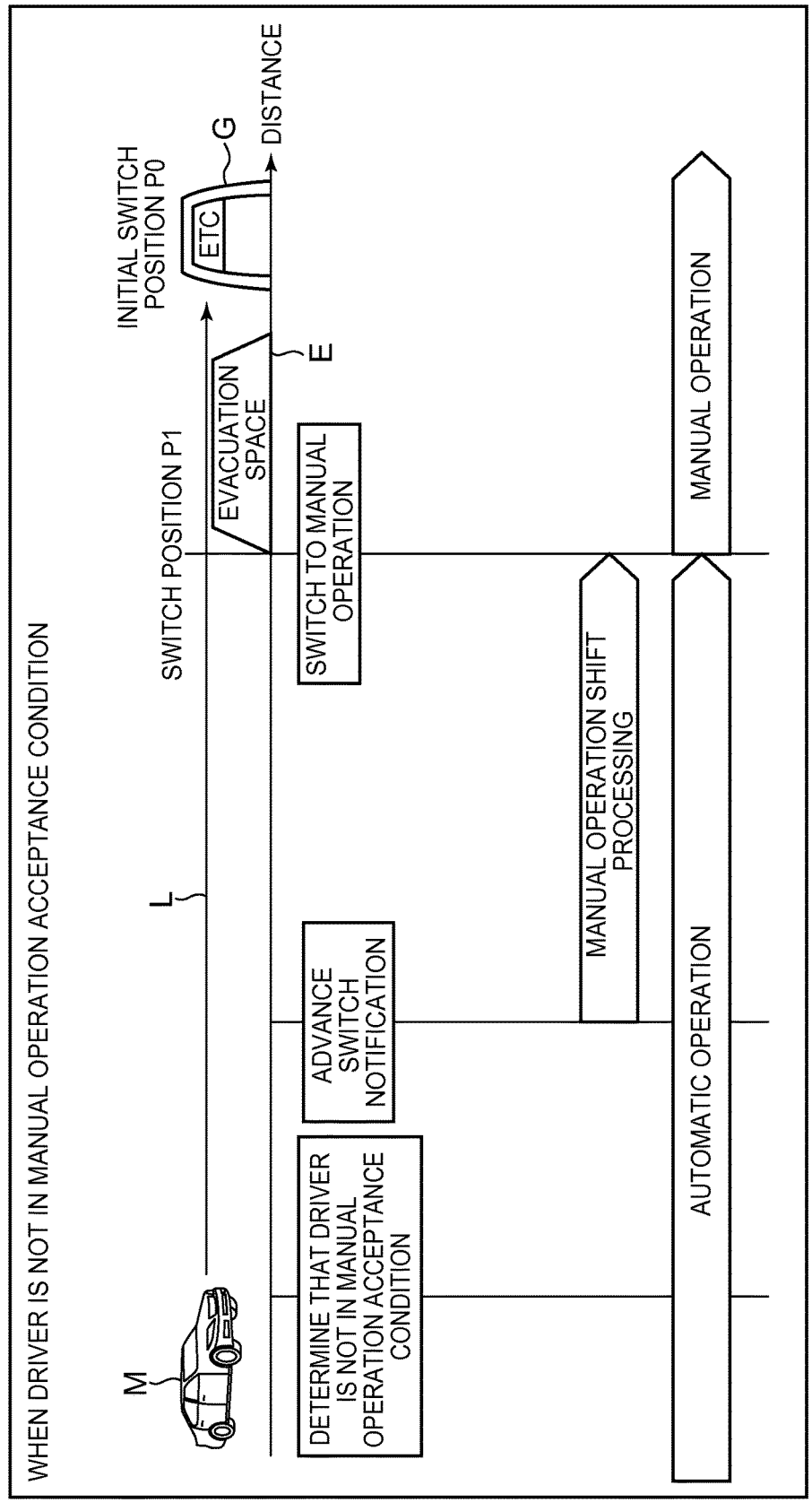
FIG. 7 is an illustrative view showing a switch from the automatic operation to the manual operation during the advance switch processing.

Next, the advance switch processing will be described with reference to FIGS. 6 and 7. FIG. 6 is a flowchart showing the advance switch processing of FIG. 3, and FIG. 7 is an illustrative view showing a switch from the automatic operation to the manual operation during the advance switch processing.

In step S31, the vehicle control ECU 2 identifies the evacuation space E using the evacuation space identification unit 25. The evacuation space identification unit 25 identifies the evacuation space E on the path L of the vehicle M before the initial switch position on the basis of the map information in the map database 3b, for example. Note that the evacuation space identification unit 25 may identify the evacuation space E before the driver condition determination unit 24 determines that the driver is not in the manual operation acceptance condition. The evacuation space identification unit 25 may identify the evacuation space E on the path L of the vehicle M before the initial switch position P0 repeatedly while the automatic operation is underway.

Next, in step S32, the vehicle control ECU 2 determines whether or not the evacuation space E is in the unusable condition using the unusable condition determination unit 26. The unusable condition determination unit 26 determines whether or not the evacuation space E is in the unusable condition on the basis of the road environment information obtained by road-to-vehicle communication or vehicle-to-vehicle communication, for example.

Next, in step S33, the vehicle control ECU 2 sets the switch position P1 using the switch position setting unit 27. The switch position setting unit 27 sets the switch position P1 in a position located before at least one evacuation space E on the path L of the vehicle M.

Next, in step S34, the vehicle control ECU 2 determines whether or not the advance switch notification timing has arrived using the notification issuance unit 28. The notification issuance unit 28 determines whether or not the advance switch notification timing has arrived using the switch position P1 as a reference. The notification issuance unit 28 determines whether or not the preset advance switch notification timing has arrived on the basis of the distance between the vehicle M and the switch position P1 on the path L of the vehicle M, for example. The notification issuance unit 28 repeats step S34 until the advance switch notification timing is determined to have arrived. When the notification issuance unit 28 determines that the advance switch notification timing has arrived (S34: YES), the vehicle control ECU 2 advances to step S35.

In step S35, the vehicle control ECU 2 issues the advance switch notification to the driver using the notification issuance unit 28. As well as issuing the advance switch notification using the notification issuance unit 28, the vehicle control ECU 2 starts the manual operation shift processing using the vehicle control unit 29.

Next, in step S36, the vehicle control ECU 2 determines whether or not the vehicle M has reached the switch position P1 using the vehicle control unit 29. The vehicle control unit 29 repeats the determination of step S36 until the vehicle M is determined to have reached the switch position P1.

When the vehicle control unit 29 determines that the vehicle M has reached the switch position P1 (S36: YES), the vehicle control ECU 2 advances to step S37. In step S37, the vehicle control ECU 2 switches the operating condition of the vehicle M from the automatic operation to the manual operation using the vehicle control unit 29. Further, the vehicle control ECU 2 notifies the driver of the existence of the evacuation space E using the notification issuance unit 28. Thereafter, the vehicle control unit 29 reflects the driving operations performed by the driver in the travel behavior of the vehicle M during the manual operation.

Note that when the evacuation space E cannot be identified in step S31 or all of the evacuation spaces E are determined to be in the unusable condition in step S32, the vehicle control ECU 2 may shift to the normal switch processing. Further, the vehicle control ECU 2 does not necessarily have to determine whether or not the evacuation space E is in the unusable condition in step S32. The vehicle control ECU 2 does not necessarily have to issue the advance switch notification and perform the manual operation shift processing simultaneously in steps S22 and S35. The vehicle control ECU 2 may start the manual operation shift processing before issuing the advance switch notification timing. Furthermore, the vehicle control ECU 2 does not necessarily have to reflect the driving operations performed by the driver in the travel behavior of the vehicle M during the manual operation shift processing.

With the vehicle control apparatus 1 according to the first embodiment, described above, the determination as to whether or not the driver is in the manual operation acceptance condition is made before the operating condition of the vehicle M is switched from the automatic operation to the manual operation, and when the driver is determined not to be in the manual operation acceptance condition, the switch position P1 is set in a position between the vehicle M and the evacuation space E on the path (a position before the evacuation space E). With the vehicle control apparatus 1, therefore, in comparison with a conventional apparatus that does not take the condition of the driver into account, the operating condition of the vehicle M can be switched to the manual operation in an appropriate position set in accordance with the condition of the driver while also taking the evacuation space E into account. Moreover, with the vehicle control apparatus 1, a position before the evacuation space E is set as the switch position P1 when the driver is determined not to be in the manual operation acceptance condition, and therefore the vehicle M can be evacuated to the evacuation space E in a case where the driver is unable to handle the manual operation.

Further, with the vehicle control apparatus 1, the determination as to whether or not the evacuation space E is in the unusable condition is made on the basis of the road environment information obtained by road-to-vehicle communication or vehicle-to-vehicle communication, and a position before an evacuation space E determined not to be in the unusable condition is set as the switch position P1. Therefore, a situation in which the vehicle M is evacuated to an evacuation space E in the unusable condition can be avoided.

Second Embodiment

Next, a vehicle control apparatus 31 according to a second embodiment will be described. The vehicle control apparatus 31 according to the second embodiment differs from the first embodiment mainly in that the switch position P1 is set in a region having a road shape that corresponds to a driving skill of the driver, and when a driving operation performed by the driver during the manual operation shift processing is determined to be an inappropriate driving operation, the vehicle M is evacuated automatically to the evacuation space E.

More specifically, the vehicle control apparatus 31 identifies the driving skill of the driver on the basis of a history of the driving operations performed by the driver, and sets the switch position P1 in a region having a road shape that corresponds to the driving skill. The road shape includes shape categories such as a rectilinear shape, a curved shape, and an intersection shape (including a fork shape), for example. The road shape also includes a road curvature, a road width (a lane width), and so on, for example. For example, when the driving skill of the driver is low (when the driver is a beginner driver, for example), the vehicle control apparatus 31 sets the switch position P1 within a rectilinear region rather than a curved region.

Further, when the driver of the vehicle M is determined not to be in the manual operation acceptance condition during the automatic operation, the vehicle control apparatus 31 issues a notification to prompt the driver to start a driving operation in the manual operation shift processing, and then determines whether or not the driving operation performed by the driver is an inappropriate driving operation. After determining that the driving operation performed by the driver is an inappropriate driving operation, the vehicle control apparatus 31 evacuates the vehicle M to the evacuation space E automatically instead of switching the operating condition of the vehicle M from the automatic operation to the manual operation in the switch position P1.

An inappropriate driving operation is a driving operation that causes the vehicle M to deviate greatly from a control target value (a steering control target value or a speed control target value, for example) of the vehicle M set when the operating condition of the vehicle M corresponds to the automatic operation, for example. An inappropriate driving operation is determined to have been performed likewise when a driving operation is not performed for a fixed time or longer after the driver receives the driving operation start notification, for example.

Figure 8:
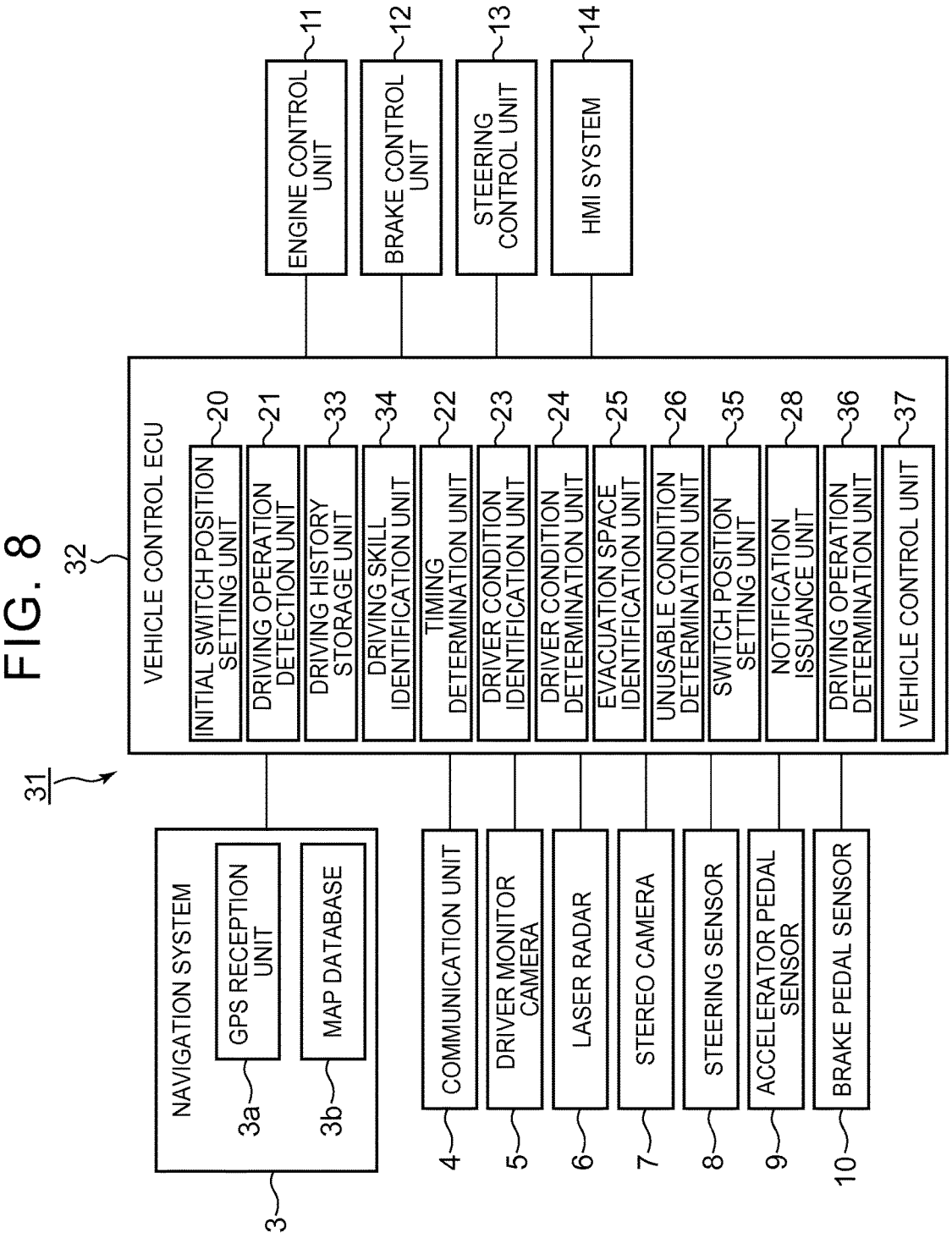
FIG. 8 is a block diagram showing a vehicle control apparatus according to a second embodiment.

A configuration of the vehicle control apparatus 31 according to the second embodiment will be described below. FIG. 8 is a block diagram showing the vehicle control apparatus 31 according to the second embodiment. In the drawings, identical or corresponding configurations have been allocated identical reference symbols, and description that duplicates the first embodiment has been omitted.

As shown in FIG. 8, a vehicle control ECU 32 of the vehicle control apparatus 31 differs from the first embodiment in further including a driving history storage unit 33, a driving skill identification unit 34, and a driving operation determination unit 36. Further, the vehicle control ECU 32 differs from the first embodiment in the functions of a switch position setting unit 35 and a vehicle control unit 37.

The driving history storage unit 33 stores the driving operations performed by the driver and detected by the driving operation detection unit 21. Note that the driving history storage unit 33 may be provided in a computer of a facility such as an information management center that can communicate via the communication unit 4 instead of in the vehicle control ECU 32. Further, a personal authentication system for personally authenticating the driver may be installed in the vehicle M. In this case, the driving history storage unit 33 stores the driving operations performed by each individual driver on the basis of authentication results from the personal authentication system.

The driving skill identification unit 34 identifies the driving skill of the driver on the basis of the driving operation history of the driver, which is stored in the driving history storage unit 33. The driving skill identification unit 34 identifies the driving skill of the driver by comparing the driving operation history of the driver in a fixed travel zone (travel zones being demarcated at preset distance intervals, for example) with model driving operations within the travel zone. The model driving operations are driving operations obtained by statistically modelling driving operations performed by a veteran driver having many years of driving experience, for example. In this case, the driving skill identification unit 34 identifies the driving skill of the driver as being steadily higher as the driving operations performed by the driver approach the model driving operations. The driving skill identification unit 34 identifies the driving skill of the driver as being steadily lower as the driving operations performed by the driver deviate from the model driving operations (as a difference between the driving operations performed by the driver and the model driving operations increases). The driving skill identification unit 34 may classify the driving skill of the driver into a veteran level, an intermediate level, and a beginner level, these levels being set in descending order of the driving skill, for example. Further, the driving skill identification unit 34 may identify the driving skill of the driver from a smoothness with which the driver switches between driving operations, a frequency with which the driver performs emergency braking, and the like on the basis of the driving operation history of the driver. Alternatively, the driving skill identification unit 34 may identify the driving skill of the driver on the basis of the driving operation history of the driver using a conventional method. The driving skill identification unit 34 may also identify the driving skill of each individual driver authenticated by the in-vehicle personal authentication system.

The switch position setting unit 35 sets the switch position P1 in which the operating condition of the vehicle M is to be switched from the automatic operation to the manual operation when the driver condition determination unit 24 determines that the driver is not in the manual operation acceptance condition. The switch position setting unit 35 according to the second embodiment identifies the road shape of the path L of the vehicle M on the basis of the map information in the map database 3b, for example. The switch position setting unit 35 may identify the road shape of the path L of the vehicle M through road-to-vehicle communication with an information management center or the like.

The switch position setting unit 35 sets the switch position P1 on the basis of the distance from the evacuation space E on the path L and the road shape. The switch position setting unit 35 sets the switch position P1 preferentially in a position within a region having a small road curvature (for example, a position in a region where the road shape is rectilinear) in the vicinity of a position located the preset clearance distance before the evacuation space E on the path L of the vehicle M. Further, the switch position setting unit 35 does not set a position within a region where the road is in the shape of an intersection, for example, as the switch position P1. The switch position setting unit 35 may set the switch position P1 preferentially in a position within a region where the road is wide.

Furthermore, the switch position setting unit 35 sets the switch position P1 in a position within a region having a road shape that corresponds to the driving skill identified by the driving skill identification unit 34. When the driving skill of the driver is low (at the beginner level), for example, the switch position setting unit 35 sets the switch position P1 in a position within a region where the road shape is rectilinear. When the driving skill of the driver is high (at the veteran level), for example, the switch position setting unit 35 may set the switch position P1 in a position within a region where the road shape is rectilinear or in a position within a region where the road shape is curved. The switch position setting unit 35 limits the road shape of the region in which the switch position P1 can be set to a road shape having a steadily smaller curvature as the driving skill of the driver decreases, for example.

Similarly, when the driving skill of the driver is low (at the beginner level), the switch position setting unit 35 sets the switch position P1 in a position within a region where the road width equals or exceeds a preset road width threshold. When the driving skill of the driver is high (at the veteran level), for example, the switch position setting unit 35 allows the switch position P1 to be set in a position within a region where the road width is narrower than the preset road width threshold. The road width threshold may be a fixed value or a variable value. The switch position setting unit 35 limits the road shape of the region in which the switch position P1 can be set to a road shape having a steadily larger width as the driving skill of the driver decreases, for example.

Note that the switch position setting unit 35 may set the switch position P1 in a position within a region having a road shape that corresponds to the driver condition identified by the driver condition identification unit 23. For example, the switch position setting unit 35 limits the road shape of the region in which the switch position P1 can be set to a road shape having a steadily larger curvature as the degree of awakeness or the degree of driving concentration of the driver decreases. Further, for example, the switch position setting unit 35 limits the road shape of the region in which the switch position P1 can be set to a road shape having a steadily larger width as the degree of awakeness or the degree of driving concentration of the driver decreases. When the switch position P1 has been set by the switch position setting unit 35, the notification issuance unit 28 issues the advance switch notification and the driving operation start notification at the preset advance switch notification timing before the vehicle M reaches the switch position P1. In the second embodiment, the notification issuance unit 28 always issues the driving operation start notification. Note that the notification issuance unit 28 does not necessarily have to issue the advance switch notification and the driving operation start notification at an identical timing.

The driving operation determination unit 36 determines whether or not the driving operation performed by the driver is an inappropriate driving operation on the basis of the detection result from the driving operation detection unit 21. For example, the driving operation determination unit 36 determines whether or not the driving operation performed by the driver is an inappropriate driving operation on the basis of a comparison result between the target control value in a case where the operating condition of the vehicle M corresponds to the automatic operation and a control value of the vehicle M resulting from the driving operation performed by the driver. The driving operation determination unit 36 may determine that the driving operation performed by the driver is an inappropriate driving operation when a difference between the target control value in a case where the operating condition of the vehicle M corresponds to the automatic operation and the control value of the vehicle M resulting from the driving operation performed by the driver equals or exceeds a preset allowable driving threshold. The allowable driving threshold is a threshold set appropriately in order to determine whether or not the driving operation performed by the driver is an inappropriate driving operation. The allowable driving threshold may be a fixed value or a variable value. The driving operation determination unit 36 determines whether or not the driving operation performed by the driver is an inappropriate driving operation after the notification issuance unit 28 issues the driving operation start notification and before the vehicle M reaches the switch position P1, for example.

When the driving operation determination unit 36 determines that the driving operation performed by the driver is not an inappropriate driving operation, the vehicle control unit 37 switches the operating condition of the vehicle M from the automatic operation to the manual operation at the point where the vehicle M reaches the switch position P1. When the driving operation determination unit 36 determines that the driving operation performed by the driver is an inappropriate driving operation, on the other hand, the vehicle control unit 37 evacuates the vehicle M automatically to the evacuation space without switching the operating condition of the vehicle M from the automatic operation to the manual operation at the switch position P1. The vehicle control unit 37 functions as an automatic evacuation unit that evacuates the vehicle M to the evacuation space automatically. After evacuating the vehicle M automatically to the evacuation space, the vehicle control unit 37 parks the vehicle M and switches the operating condition of the vehicle M from the automatic operation to the manual operation, for example.

Figure 9:
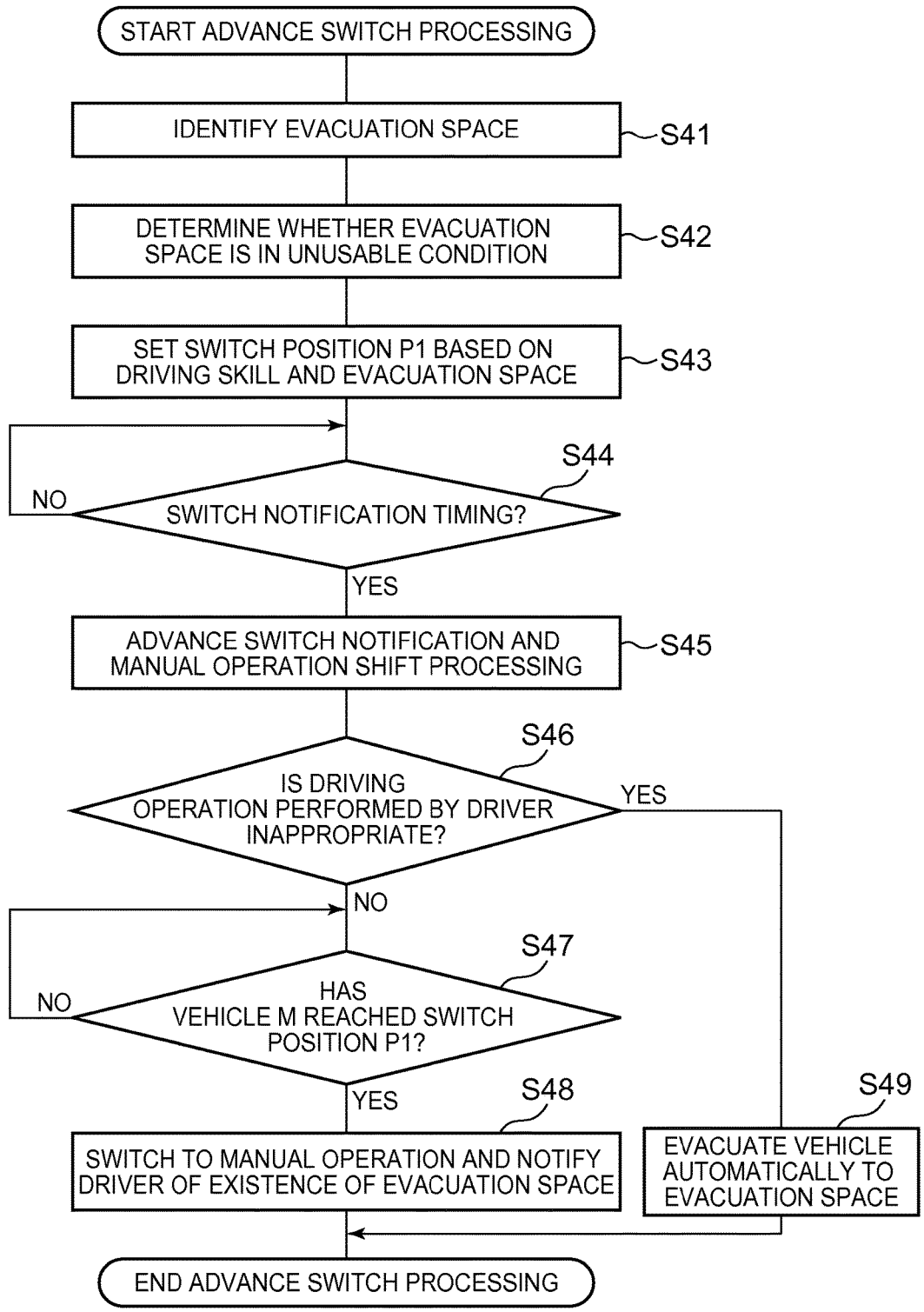
FIG. 9 is a flowchart showing advance switch processing executed by the vehicle control apparatus according to the second embodiment.

Next, vehicle control processing (advance switch processing) executed by the vehicle control apparatus 31 according to the second embodiment will be described with reference to FIG. 9. FIG. 9 is a flowchart showing the advance switch processing executed by the vehicle control apparatus 31 according to the second embodiment. The vehicle control apparatus 31 executes the advance switch processing shown in FIG. 9 in place of the advance switch processing according to the first embodiment, shown in FIG. 6, for example. Note that processing executed in steps S41, S42, S44, S47, and S48 shown in FIG. 9 is identical to processing executed in step S31, S32, S34, S36, and S37 of FIG. 6, and therefore detailed description thereof has been omitted.

As shown in FIG. 9, in step S41, the vehicle control ECU 32 identifies the evacuation space using the evacuation space identification unit 25. Next, in step S42, the vehicle control ECU 32 determines whether or not the evacuation space E is in the unusable condition using the unusable condition determination unit 26.

Next, in step S43, the vehicle control ECU 32 sets the switch position P1 using the switch position setting unit 35. The switch position setting unit 35 sets the switch position P1 in a position located before at least one evacuation space E on the path L of the vehicle M. The switch position setting unit 35 sets the switch position P1 on the basis of the distance from the evacuation space E on the path L and the road shape. Further, the switch position setting unit 35 sets switch position P1 in a position within a region having a road shape that corresponds to the driving skill identified by the driving skill identification unit 34. Note that the driving skill identification unit 34 identifies the driving skill of the driver on the basis of the driving operation history stored in the driving history storage unit 33 repeatedly at intervals of a preset period (for example, a period of one week), for example.

Next, in step S44, the vehicle control ECU 32 determines whether or not the advance switch notification timing has arrived using the notification issuance unit 28. The notification issuance unit 28 determines whether or not the advance switch notification timing has arrived using the switch position P1 as a reference. For example, the notification issuance unit 28 determines whether or not the preset advance switch notification timing has arrived on the basis of the distance between the vehicle M and the switch position P1 on the path L of the vehicle M. The notification issuance unit 28 repeats step S44 until the advance switch notification timing is determined to have arrived. When the notification issuance unit 28 determines that the advance switch notification timing has arrived (S44: YES), the vehicle control ECU 32 advances to step S45.

In step S45, the vehicle control ECU 32 of the vehicle control apparatus 31 issues the advance switch notification to the driver using the notification issuance unit 28. The notification issuance unit 28 issues the advance switch notification and the driving operation start notification to the driver. Further, the vehicle control ECU 32 starts the manual operation shift processing using the vehicle control unit 37. In the manual operation shift processing, the vehicle control unit 37 reflects driving operations performed by the driver within the preset allowable range in the travel behavior of the vehicle M. During the manual operation shift processing, the driving history storage unit 33 stores the driving operations performed by the driver and detected by the driving operation detection unit 21.

Next, in step S46, the vehicle control ECU 32 determines whether or not the driving operation performed by the driver is an inappropriate driving operation using the driving operation determination unit 36. The driving operation determination unit 36 determines whether or not the driving operation is an inappropriate driving operation before the vehicle M reaches the switch position P1. The vehicle control ECU 32 determines whether or not the driving operation performed by the driver is an inappropriate driving operation on the basis of the detection result from the driving operation detection unit 21.

Figure 10:
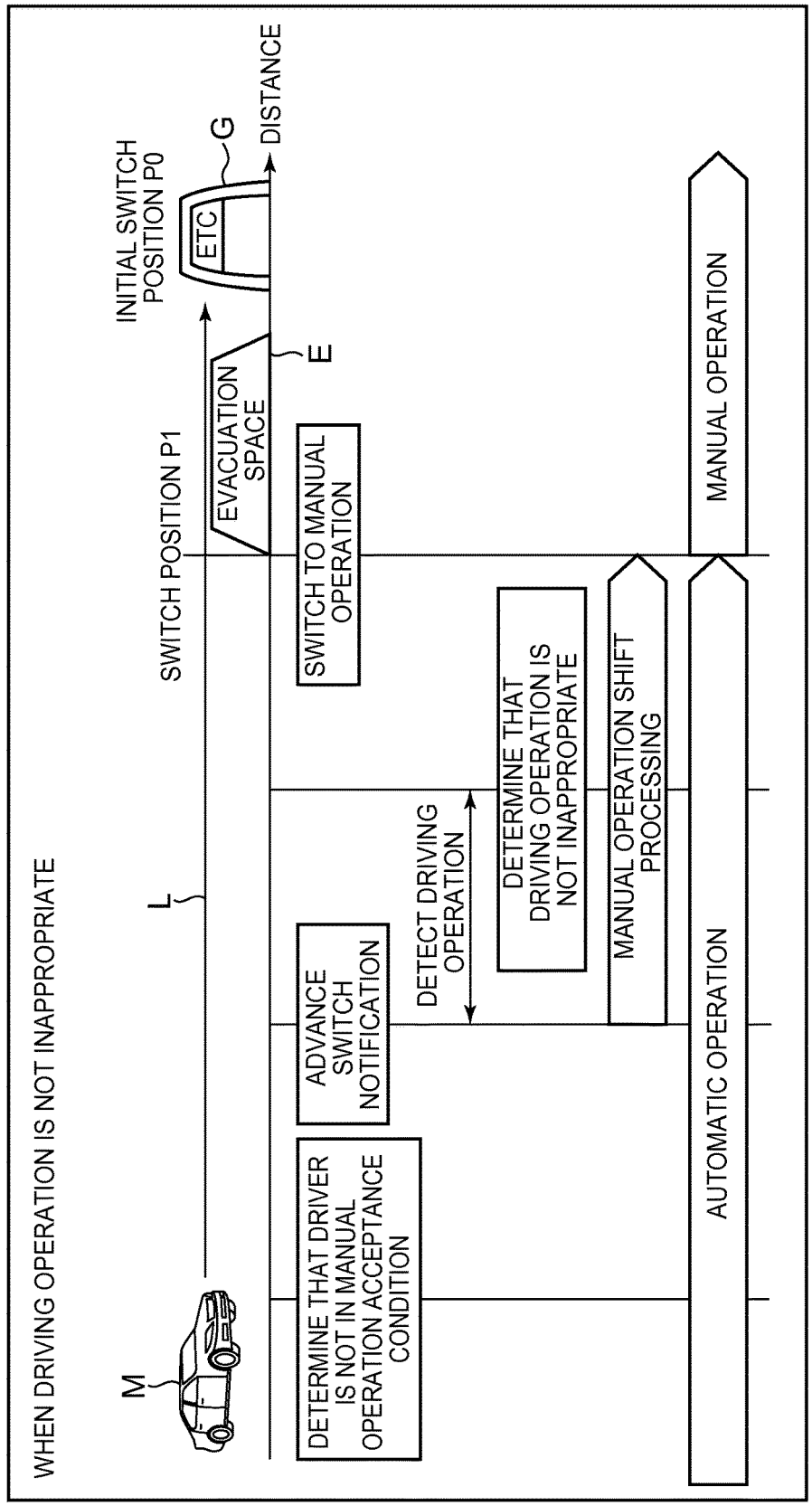
FIG. 10 is an illustrative view showing the advance switch processing performed in a case where a driving operation performed by a driver is determined not to be an inappropriate driving operation.

When the driving operation determination unit 36 determines that the driving operation performed by the driver is not an inappropriate driving operation (S46: NO), the vehicle control ECU 32 advances to step S47. Here, FIG. 10 is an illustrative view showing the advance switch processing executed in a case where the driving operation performed by the driver is determined not to be inappropriate driving operation. In this case, similar processing to the advance switch processing according to the first embodiment is performed.

In step S47, the vehicle control ECU 32 determines whether or not the vehicle M has reached the switch position P1 using the vehicle control unit 37. The vehicle control unit 37 repeats the determination of step S47 until the vehicle M is determined to have reached the switch position P1. When the vehicle control unit 37 determines that the vehicle M has reached the switch position P1 (S47: YES), the vehicle control ECU 32 advances to step S48.

In step S48, the vehicle control ECU 32 switches the operating condition of the vehicle M from the automatic operation to the manual operation using the vehicle control unit 37. Further, the vehicle control ECU 32 notifies the driver of the existence of the evacuation space using the notification issuance unit 28. Thereafter, the vehicle control unit 37 reflects the driving operations performed by the driver in the travel behavior of the vehicle M during the manual operation.

Figure 11:
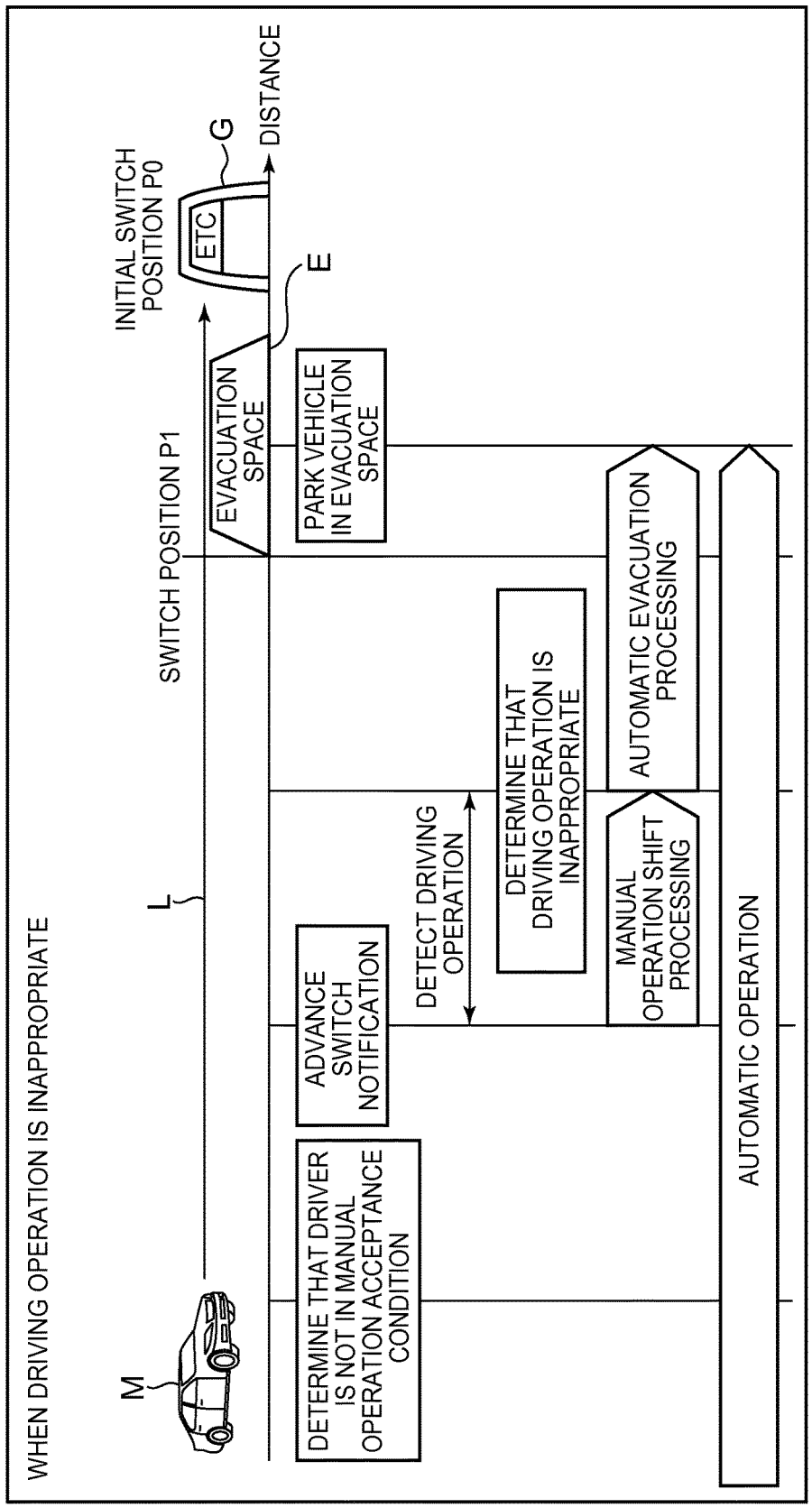
FIG. 11 is an illustrative view showing the advance switch processing performed in a case where the driving operation performed by the driver is determined to be an inappropriate driving operation.

When the driving operation determination unit 36 determines that the driving operation performed by the driver is an inappropriate driving operation (S46: YES), on the other hand, the vehicle control ECU 32 advances to step S49. Here, FIG. 11 is an illustrative view showing the advance switch processing executed in a case where the driving operation performed by the driver is determined to be inappropriate driving operation. When the driving operation determination unit 36 determines that the driving operation performed by the driver is an inappropriate driving operation, the vehicle control ECU 32 cancels the manual operation shift processing.

In step S49, the vehicle control ECU 32 performs the automatic evacuation processing to evacuate the vehicle M to the evacuation space E automatically using the vehicle control unit 37. The vehicle control unit 37 evacuates the vehicle M to the evacuation space E automatically by transmitting control signals to the engine control unit 11, the brake control unit 12, and the steering control unit 13.

With the vehicle control apparatus 31 according to the second embodiment, described above, the switch position P1 is set in a position within a region having a road shape that corresponds to the driving skill of the driver, and therefore a situation in which the switch position P1 is set on a curve such that the operating condition of the vehicle M is switched to the manual operation on the curve even though the driver is a beginner having poor driving skills, for example, can be avoided. With the vehicle control apparatus 31, therefore, the operating condition of the vehicle M can be switched from the automatic operation to the manual operation in an appropriate position set in consideration of the driving skill of the driver.

Further, with the vehicle control apparatus 31, a notification to prompt the driver to start a driving operation is issued before the vehicle M reaches a switch position P1, and when the driving operation performed by the driver is determined thereafter to be an inappropriate driving operation, the vehicle M is evacuated automatically to the evacuation space E. As a result, a situation in which the operating condition of the vehicle M is switched to the manual operation even though the driver is unable to handle the manual operation favorably can be avoided.

Embodiments of the invention were described above, but the invention is not limited to the above embodiments. The above embodiments according to the invention may be subjected to various modifications and improvements on the basis of common knowledge of persons skilled in the art. Further, the respective configurations of the first embodiment and the second embodiment may be employed in appropriate combinations.

More specifically, the driving history storage unit 33, driving skill identification unit 34, and switch position setting unit 35 according to the second embodiment may be employed in the first embodiment. In this case, the switch position P1 can be set in a position within a region having a road shape corresponding to the driving skill likewise in the first embodiment. The driving operation determination unit 36 and the vehicle control unit 37 may also be employed in the first embodiment. In this case, the vehicle M can be evacuated automatically to the evacuation space E when the driving operation performed by the driver is an inappropriate driving operation likewise in the first embodiment.

What is claimed is:

1. A vehicle control apparatus that switches an operating condition of a vehicle between an automatic operation and a manual operation, and switches the operating condition of the vehicle to the manual operation when the vehicle reaches a preset initial switch position while the automatic operation is underway, the vehicle control apparatus comprising:
   a timing determination unit configured to determine whether or not a preset condition determination timing has arrived on the basis of a distance between the vehicle and the initial switch position on a path of the vehicle when the operating condition of the vehicle corresponds to the automatic operation;
   a driver condition identification unit configured to identify at least one of a degree of awakeness and a degree of concentration associated with a driver of the vehicle;
   a driver condition determination unit configured to determine whether or not the driver is capable of manually driving the vehicle on the basis of at least one of the degree of awakeness and the degree of concentration, when the timing determination unit determines that the condition determination timing has arrived;
   an evacuation space identification unit configured to identify an evacuation space provided on the path of the vehicle before the initial switch position on the basis of map information; and
   a switch position setting unit configured to set a switch position in which the operating condition of the vehicle is to be switched from the automatic operation to the manual operation, in a position between the vehicle and the evacuation space on the path of the vehicle when the driver condition determination unit determines that the driver is not in the manual operation acceptance condition; and
   a vehicle control unit configured to evacuate the vehicle to the evacuation space automatically when:
      the vehicle reaches a position located at a predetermined distance from the preset initial switch position, and
      the driver condition determination unit determines that the driver is not capable of manually driving the vehicle.

2. The vehicle control apparatus according to claim 1, wherein the vehicle control unit is further configured to determine whether or not the vehicle has reached the switch position on the basis of the map information, and switches the operating condition of the vehicle from the automatic operation to the manual operation after determining that the vehicle has reached the switch position.

3. The vehicle control apparatus according to claim 1, further comprising:
   a driving operation detection unit configured to detect a driving operation performed on the vehicle by the driver;
   a notification issuance unit configured to issue a notification to prompt the driver to start a driving operation before the vehicle reaches the switch position when the switch position has been set by the switch position setting unit;
   a driving operation determination unit configured to determine whether or not the driving operation performed by the driver is an inappropriate driving operation on the basis of a detection result from the driving operation detection unit after the notification issuance unit issues the notification to prompt the driver to start the driving operation but before the vehicle reaches the switch position; and
   wherein the vehicle control unit is further configured to evacuate the vehicle automatically to the evacuation space when the driving operation determination unit determines that the driving operation is an inappropriate driving operation.

4. The vehicle control apparatus according claim 1, further comprising a driving skill identification unit configured to identify a level of driving skill of the driver by comparing a driving operation history of the driver to a model driving operation,
   wherein the switch position setting unit is configured to set the switch position in a position within a region having a road shape that corresponds to the level of driving skill of the driver, identified by the driving skill identification unit.

5. The vehicle control apparatus according to claim 1, further comprising an unusable condition determination unit configured to determine whether or not the evacuation space is in an unusable condition on the basis of road environment information obtained by road-to-vehicle communication or vehicle-to-vehicle communication,
   wherein the switch position setting unit is configured to set the switch position in a position between the vehicle and the evacuation space determined by the unusable condition determination unit not to be in the unusable condition.

6. A vehicle control method for a vehicle in which an operating condition is switched between an automatic operation and a manual operation, and the operating condition is switched to the manual operation when the vehicle reaches a preset initial switch position while the automatic operation is underway, the vehicle control method comprising:
   determining whether or not a preset condition determination timing has arrived on the basis of a distance between the vehicle and the initial switch position on a path of the vehicle when the operating condition of the vehicle corresponds to the automatic operation;
   identifying at least one of a degree of awakeness and a degree of concentration associated with a driver of the vehicle;
   determining whether or not the driver is capable of manually driving the vehicle on the basis of at least one of the degree of awakeness and the degree of concentration, when the condition determination timing is determined to have arrived;
   identifying an evacuation space provided on the path of the vehicle before the initial switch position on the basis of map information; and
   setting a switch position in which the operating condition of the vehicle is to be switched from the automatic operation to the manual operation, in a position between the vehicle and the evacuation space on the path of the vehicle when the driver is determined not to be in the manual operation acceptance condition; and
   evacuating the vehicle to the evacuation space automatically when the vehicle reaches a position located at a predetermined distance from the preset initial switch position, and it is determined that the driver is not capable of manually driving the vehicle.

7. The vehicle control method according to claim 6, further comprising:

determining whether or not the vehicle has reached the switch position on the basis of the map information; and switching the operating condition of the vehicle from the automatic operation to the manual operation after determining that the vehicle has reached the switch position.

* * * * *